United States Patent
Aldred et al.

(10) Patent No.: US 8,838,426 B2
(45) Date of Patent: Sep. 16, 2014

(54) SYSTEM AND METHOD FOR ONLINE AUTOMATION

(75) Inventors: Walter Aldred, Thriplow (GB); Jonathan Dunlop, Cambridge (GB); James Belaskie, Beijing (CN)

(73) Assignee: Schlumberger Technology Corporation, Sugar Land, TX (US)

(*) Notice: Subject to any disclaimer, the term of this patent is extended or adjusted under 35 U.S.C. 154(b) by 495 days.

(21) Appl. No.: 13/062,782

(22) PCT Filed: Oct. 14, 2009

(86) PCT No.: PCT/IB2009/007127
§ 371 (c)(1), (2), (4) Date: May 31, 2011

(87) PCT Pub. No.: WO2010/043951
PCT Pub. Date: Apr. 22, 2010

(65) Prior Publication Data
US 2011/0220410 A1 Sep. 15, 2011

Related U.S. Application Data

(60) Provisional application No. 61/105,184, filed on Oct. 14, 2008.

(51) Int. Cl.
G06G 7/48 (2006.01)
E21B 44/00 (2006.01)

(52) U.S. Cl.
CPC ..................................... *E21B 44/00* (2013.01)
USPC .......................................................... 703/10

(58) Field of Classification Search
USPC ........................................................... 703/10
See application file for complete search history.

(56) References Cited

U.S. PATENT DOCUMENTS

| | | |
|---|---|---|
| 5,368,108 A | 11/1994 | Aldred et al. |
| 5,952,569 A | 9/1999 | Jervis et al. |
| 5,955,966 A | 9/1999 | Jeffryes et al. |
| 6,019,180 A | 2/2000 | Pafitis et al. |
| 6,549,854 B1 | 4/2003 | Malinverno et al. |
| 6,826,486 B1 | 11/2004 | Malinverno |

(Continued)

FOREIGN PATENT DOCUMENTS

| | | |
|---|---|---|
| CA | 2201541 C | 8/2005 |
| GB | 2390712 A | 1/2004 |
| WO | 0048022 A1 | 8/2000 |
| WO | 2010043951 A2 | 4/2010 |

OTHER PUBLICATIONS

Hargreaves et al.; Early Kick Detection for Deepwater Drilling: New Probabilistic Methods Applied in the Field; SPE 71369; 2001; 12 pages.*

(Continued)

*Primary Examiner* — Hugh Jones

(57) ABSTRACT

A changepoint detector for modeling data received from at least one sensor in a process in the hydrocarbon industry. The data is segmented into a plurality of segments and for each segment a model is assigned and the data corresponding to the segment fit to that model. A plurality of segmentations are thus provided and these segmentations ar evaluated and assigned weights indicative of the fit of the models of the segmentation t the underlying data. The segmentation models are further used to calculate a result that may be input to a process control program.

32 Claims, 18 Drawing Sheets

(56) References Cited

U.S. PATENT DOCUMENTS

| | | |
|---|---|---|
| 6,868,920 B2 | 3/2005 | Hoteit et al. |
| 7,128,167 B2 | 10/2006 | Dunlop et al. |
| 2004/0124009 A1 | 7/2004 | Hoteit et al. |
| 2004/0124012 A1 | 7/2004 | Dunlop et al. |
| 2006/0033638 A1 | 2/2006 | Hall et al. |
| 2007/0168133 A1 | 7/2007 | Bennett et al. |

OTHER PUBLICATIONS

Bennett et al; "Fast model updates using wavelets"; Multiscale Modeling and Simulation 3 (1), pp. 106-130 (2004).

Doyen et al "Seismic Pore Pressure Prediction With Uncertainty Using a Probabilistic Mechanical Earth Model" Conference paper 2003-1366; Society of Exploration Geophysicists Annual Meeting, Oct. 26-31, 2003, Dallas, Texas, 4 pages.

Malinverno et al "A Monte Carlo Method to Quantify Uncertainty in the Inversion of Zero-Offset VSP Data" Conference Paper 2000-2393; Society of Exploration Geophysicists Annual Meeting, Aug. 6-11, 2000, Calgary, Alberta, 4 pages.

Malinverno et al; "Integrating Diverse Measurements to Predict Pore Pressure With Uncertainties While Drilling"; SPE paper 90001; SPE Annual Technical Conference and Exhibition, Sep. 26-29, 2004, Houston, Texas, 11 pages.

Malinverno et al; "Bayesian Inversion of DC Electrical Measurements Applied to Reservoir Monitoring"; SEG Conference Paper 1999-0220; Society of Exploration Geophysicists Annual Meeting, Oct. 31-Nov. 5, 1999, Houston, Texas, 4 pages.

Malinverno et al; "Real-Time 3D Earth Model Updating While Drilling a Horizontal Well"; SPE Paper 77525; SPE Annual Technical Conference and Exhibition, Sep. 29-Oct. 2, 2002, San Antonio, Texas, 11 pages.

Detournay et al: "Drilling response of drag bits: Theory and experiment"; International Journal of Rock Mechanics & Mining Sciences 45 (2008): 1347-1360.

Sivia et al: "Data Analysis: A Bayesian Tutorial" contents and first chapter (OUP Oxford, 2ed. 2006), 20 pages.

Aldred et al., "Managing Drilling Risk," Oilfield Review, Summer 1999, vol. 11(2): pp. 2-19.

Bourgois et al., "The MDS System: Computers Transforming Drilling," Oilfield Review, Jan. 1990, vol. 2(1): pp. 4-15.

\* cited by examiner

SYSTEM AND METHOD FOR ONLINE AUTOMATION

CROSS-REFERENCE TO RELATED APPLICATIONS

This application is a non-provisional application claiming priority from U.S. Provisional Patent Application Ser. No. 61/105,184, filed on Oct. 14, 2008 and entitled "SYSTEM AND METHOD FOR REAL-TIME MANAGEMENT OF AN AUTOMATED INDUSTRIAL PROCEDURE USING ONLINE DATA FUSION," the teachings of which are incorporated by reference herein as if reproduced in full below.

FIELD

The present invention relates generally to process automation, and more particularly but not by limitation to real-time management of control parameters by detecting changepoints in data streams and using the detected changepoints to accurately model input data and thereby provide a basis for timely and accurate adjustment of the control parameters.

BACKGROUND

In many industries, automated processes are now used for fabrication of products, monitoring operation of systems, designing systems, interacting machinery with other objects and/or the like. In such automated industrial processes, there is a broad latitude of issues that may affect the process. These issues may cause a halt and/or break down of the automated industrial process, may degrade the operation of the automated industrial process, may change the background, environment and/or the like the automated industrial process is working in and so may change how the automated industrial process works, what the automated industrial process achieves, the goal of the automated industrial process and/or the like.

One or more of the broad latitude of issues that may affect the automated industrial process may arise during the automated industrial process causing real time changes to the operation of the automated industrial process. To mitigate such issues, forward looking models of the automated industrial process may be analyzed and used to control the automated industrial process. Such models may be determined from results from prior processes, theoretically, experimentally and/or the like. Mitigation of such issues may also be achieved by obtaining data from the automated industrial process and/or the environment in which the automated industrial process occurs and retroactively identifying the existence of an issue.

Merely by way of example, in the hydrocarbon industry, the process of drilling into a hydrocarbon reservoir may be impeded by a wide variety of problems and may require monitoring/interpretation of a considerable amount of data. Accurate measurements of downhole conditions, downhole equipment properties, geological properties, rock properties, drilling equipment properties, fluid properties, surface equipment properties and/or the like may be analyzed by a drilling crew to minimize drilling risks, to make determinations as to how to optimize the drilling procedure given the data and/or to detect/predict the likelihood of a problem/decrease in drilling efficiency and/or the like.

Similarly, in hydrocarbon exploration, hydrocarbon extraction, hydrocarbon production, hydrocarbon transportation and/or the like many conditions may be sensed and data gathered to provide for optimizing and/or preventing/mitigating issues/problems concerning the exploration, production and or transportation of hydrocarbons. Hydrocarbons are essentially a lifeblood of the modern industrial society, as such vast amounts of hydrocarbons are being prospected, retrieved and transported on a daily basis. Associated with this industry are an enormous amount of sensors gathering enumerable amounts of data relevant to the exploration, production and or transportation of hydrocarbons.

To provide for safe and efficient exploration, production and or transportation of hydrocarbons this data must be processed. While computers may be used to process the data, it is often difficult to accurately process the incoming data for real-time control of the hydrocarbon processes. As such, human operators are commonly used to control the hydrocarbon processes and to make decisions on optimizing, preventing risks, identifying faults and/or the like based on interpretation of the raw/processed data. However, optimization of a hydrocarbon process and/or mitigation and detection of issues/problems by a human controller may often be degraded by fatigue, high workload, lack of experience, the difficulty in manually analyzing complex data and/or the like. Furthermore, noisy data may have a significant impact on a human observer's ability to take note of or understand the meaning occurrences reflected in the data.

The detection of occurrences reflected in the data goes beyond detection of issues and problems. Accurate analysis of operating conditions may allow for an operator to operate the industrial process at near optimal conditions. For example, in the hydrocarbon industry, the bit-response to changes in parameters such as drill-bit rotational speed and weight-on-bit (WOB) while drilling into a hydrocarbon reservoir is very much affected by changes in the lithological environment of drilling operations. Accurate and real-time knowledge of a transition from one environment to another, e.g., one formation to another, and real-time analysis of how such environmental conditions impact the effect that parameter changes are likely to have on bit-response may greatly improve the expected rate of penetration (ROP).

Similarly, the constraints that limit the range of the drilling parameters may change as the drilling environment changes. These constraints, e.g., the rate at which cuttings are removed by the drilling fluids, may limit the maximum permissible drilling parameter values. Without accurate knowledge of these changes in the constraints, a driller may not be fully aware of where the constraints lie with respect to the ideal parameter settings and for the sake of erring on the side of caution, which is natural considering the dire consequences of drilling equipment failures and drilling accidents, a driller may operate the drilling process at parameters far removed the actual optimal parameters. Considering that drilling, like many other processes associated with the production and transport of hydrocarbons is an extremely costly procedure, the operation of the drilling system at less than optimal parameters can be extremely costly.

Similarly, accurate measurement of the direction (Toolface) and curvature (Dogleg-Severity (DLS)) of a borehole is necessary for a driller to accurately direct a drilling process to a target. Measurements of these properties are typically taken at rather infrequent intervals (e.g., every 30 to 90 feet) while the drill-bit is off bottom and the drill string is stationary. However, modern drilling equipment may provide for taking directional measurements continuously while drilling. Unfortunately, the measurements obtained while-drilling are generally very noisy and difficult for a driller to interpret because of the noise in the data.

Furthermore, the noise in the data tends to be amplified in any direct computation of the Dogleg-Severity and Toolface from the continuous surveys and the results are generally of such low quality to be of little value to the drillers. As a result, the while-drilling data is often not used in computation of Dogleg-Severity, Toolface and/or the like and instead the infrequent measurements, which require the drilling process to be halted while the measurements are taken, are often still used to determine drilling trajectory and/or the like.

In the hydrocarbon industry, as in other industries, event detection systems have generally depended upon people, such as drilling personnel, to manage processes and to identify occurrences of events, such as a change in a rig state. Examples of rig state detection in drilling may be found in the following references: "The *MDS System: Computers Transform Drilling*", Bourgois, Burgess, Rike, Unsworth, Oilfield Review Vol. 2, No. 1, 1990, pp. 4-15; and "*Managing Drilling Risk*" Aldred et al., Oilfield Review, Summer 1999, pp. 219.

With regard to the hydrocarbon industry, some very limited techniques have been used for detecting a certain type of event, i.e., possible rig states, such as "in slips", "not in slips", "tripping in" or "tripping out". These systems take a small set of rig states, where each rig state is an intentional drilling state, and use probability analysis to retroactively determine which of the set of intentional drilling states the rig has moved into. Probabilistic rig state detection is described in U.S. Pat. No. 7,128,167, the entirety of which is hereby incorporated by reference for all purposes.

In the hydrocarbon industry, there are ever more and better sensors for sensing data related to the exploration, extraction, production and/or transportation of the hydrocarbons. To better control/automate processes related to the exploration, extraction, production and/or transportation of the hydrocarbons and/or to better process/interpret the data for human controllers/operators of the processes related to the exploration, extraction, production and/or transportation of the hydrocarbons the sensed data associated with the processes must be quickly and effectively handled.

SUMMARY

Embodiments of the present invention provide systems and methods for real-time/online interpretation/processing of data associated with a hydrocarbon related procedure to provide for real-time automation/control of the procedure. In an embodiment of the present invention the data is segmented and the segments/changepoints between segments are analyzed so that the data can be processed and provide for the operation/control of the hydrocarbon related procedure.

In one embodiment, a method for automating a process in the hydrocarbon industry is provided, the method comprising:
  receiving a stream of input data from the at least one sensor;
  upon receiving a new data item from the input data stream:
    postulating that the data stream is segmented according to a plurality of possible segmentations each comprising a plurality of segments divided by changepoints each changepoint indicative of a change in operating condition;
    evaluating each segmentation by: fitting the input stream data corresponding to each segment in the segmentation to a model corresponding to the each segment in the segmentation; and evaluating the segmentations by determining how well the models for the segments of each segmentation fit the input data corresponding to each segment of each segmentation; and
  using at least one of the segmentations and the models corresponding to the segments of the at least one of the segmentations as input to a control program controlling at least one parameter of the process in the hydrocarbon industry.

In another embodiment, a system for automating a process in the hydrocarbon industry is provided, the system comprising:
  a processor configured in use to receiving a stream of input data from at least one sensor related to the hydrocarbon process;
  software installed on the processor configured to postulating that the data stream is segmented according to a plurality of possible segmentations each comprising a plurality of segments divided by changepoints each changepoint indicative of a change in operating condition upon receiving a new data item from the input data stream and to evaluate each segmentation by fitting the input stream data corresponding to each segment in the segmentation to a model corresponding to the each segment in the segmentation; and evaluating the segmentations by determining how well the models for the segments of each segmentation fit the input data corresponding to each segment of each segmentation; and
  an output on the processor for communing using at least one of the segmentations and the models corresponding to the segments of the at least one of the segmentations as input to a control program controlling at least one parameter of the process in the hydrocarbon industry or to a display for use by a human operator.

In one aspect, the hydrocarbon related industry is drilling and a method of operating an automated drilling apparatus is provided, the method comprising:
  receiving a measurement indicative of depth-of-cut;
  receiving weight-on-bit and drill-bit rotational speed measurements;
  determining a functional relationship between rate of penetration and weight-on-bit;
  from the functional relationship between depth-of-cut and, weight-on-bit, determine a second functional relationship defining rate-of-penetration as a function of drill-bit rotational speed and weight-on-bit;
  determine operating constraints defining a safe operating envelope as a function of drill-bit rotational speed and weight-on-bit;
  determine the rotational speed and weight-in-bit parameters that provide the optimal rate-of-penetration location within the safe operating envelope; and
  suggest a combination of drill-bit rotational speed and weight-on-bit moving to move the drill-bit rotational speed and weight-on-bit towards the rotational speed and weight-on-bit parameters for the optimal rate-of-penetration location.

BRIEF DESCRIPTION OF THE DRAWINGS

The present disclosure is described in conjunction with the appended figures.

FIG. 4, which comprises

FIG. 9, which comprises

FIG. 10, which comprises

Figure 1:
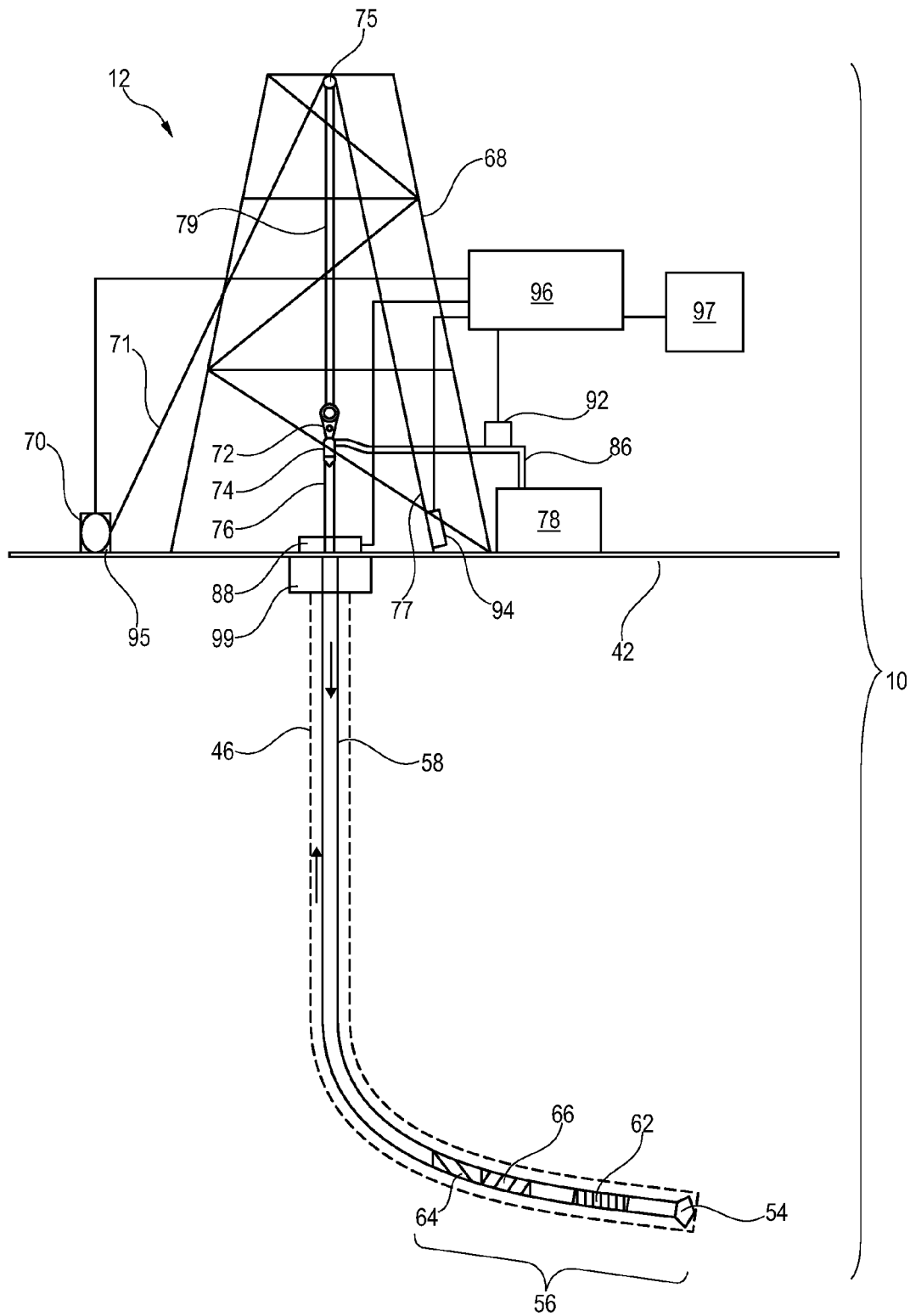
FIG. 1 is a schematic diagram illustrating a drilling system including an online automation/control system, in accordance with an embodiment of the present invention.

In the appended figures, similar components and/or features may have the same reference label. Further, various components of the same type may be distinguished by following the reference label by a dash and a second label that distinguishes among the similar components or by appending the reference label with a letter. If only the first reference label is used in the specification, the description is applicable to any one of the similar components having the same first reference label irrespective of the second reference label or appended letter.

DETAILED DESCRIPTION

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

It should also be noted that in the description provided herein, computer software is described as performing certain tasks. For example, we may state that a changepoint detector module performs a segmentation of a data stream by following a described methodology. That, of course, is intended to mean that a central processing unit executing the instructions included in the changepoint detector (or equivalent instructions) would perform the segmentation by appropriately manipulating data and data structures stored in memory and secondary storage devices controlled by the central processing unit. Furthermore, while the description provides for embodiments with particular arrangements of computer processors and peripheral devices, there is virtually no limit to alternative arrangements, for example, multiple processors, distributed computing environments, web-based computing. All such alternatives are to be considered equivalent to those described and claimed herein.

It should also be noted that in the development of any such actual embodiment, numerous decisions specific to circumstance must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In this disclosure, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

FIG. 1 shows a drilling system 10 using changepoint detection in the control of the drilling apparatus, according to one embodiment of the present invention. As depicted, a drill string 58 is shown within a borehole 46. The borehole 46 is located in the earth 40 having a surface 42. The borehole 46 is being cut by the action of a drill bit 54. The drill bit 54 is disposed at the far end of the bottomhole assembly 56 that is itself attached to and forms the lower portion of the drill string 58.

The bottomhole assembly 56 contains a number of devices including various subassemblies. According to an embodiment of the present invention, measurement-while-drilling (MWD) subassemblies may be included in subassemblies 62. Examples of typical MWD measurements include direction, inclination, survey data, downhole pressure (inside the drill pipe, and outside or annular pressure), resistivity, density, and porosity. The subassemblies 62 may also include is a subassembly for measuring torque and weight on bit.

The subassemblies 62 may generate signals related to the measurements made by the subassemblies 62. The signals from the subassemblies 62 may be processed in processor 66. After processing, the information from processor 66 may be communicated to communication assembly 64. The communication assembly 64 may comprise a pulser, a signal processor, an acoustic processor and/or the like. The communication assembly 64 converts the information from processor 66 into signals that may be communicated as pressure pulses in the drilling fluid, as signals for communication through an optic fibre, a wire and/or the like, or signals for wireless or acoustic communication and/or the like. Embodiments of the present invention may be used with any type of sensor associated with the hydrocarbon industry and with any type of telemetry system used with the sensor for communicating data from the sensor to the online changepoint detector, according to one embodiment of the present invention.

The subassemblies in the bottomhole assembly 56 can also include a turbine or motor for providing power for rotating and steering drill bit 54. In different embodiments, other telemetry systems, such as wired pipe, fiber optic systems, acoustic systems, wireless communication systems and/or the like may be used to transmit data to the surface system.

The drilling rig 12 includes a derrick 68 and hoisting system, a rotating system, and a mud circulation system. The hoisting system which suspends the drill string 58, includes draw works 70, fast line 71, crown block 75, drilling line 79, traveling block and hook 72, swivel 74, and deadline 77. The rotating system includes kelly 76, rotary table 88, and engines (not shown). The rotating system imparts a rotational force on the drill string 58 as is well known in the art. Although a system with a kelly and rotary table is shown in FIG. 1, those of skill in the art will recognize that the present invention is also applicable to top drive drilling arrangements. Although the drilling system is shown in FIG. 1 as being on land, those of skill in the art will recognize that the present invention is equally applicable to marine environments.

The mud circulation system pumps drilling fluid down the central opening in the drill string. The drilling fluid is often called mud, and it is typically a mixture of water or diesel fuel, special clays, and other chemicals. The drilling mud is stored in mud pit 78. The drilling mud is drawn in to mud pumps (not shown), which pump the mud through stand pipe 86 and into the kelly 76 through swivel 74 which contains a rotating seal.

The mud passes through drill string 58 and through drill bit 54. As the teeth of the drill bit grind and gouges the earth formation into cuttings the mud is ejected out of openings or nozzles in the bit with great speed and pressure. These jets of mud lift the cuttings off the bottom of the hole and away from the bit 54, and up towards the surface in the annular space between drill string 58 and the wall of borehole 46.

At the surface the mud and cuttings leave the well through a side outlet in blowout preventer 99 and through mud return line (not shown). Blowout preventer 99 comprises a pressure control device and a rotary seal. The mud return line feeds the mud into separator (not shown) which separates the mud from the cuttings. From the separator, the mud is returned to mud pit 78 for storage and re-use.

Various sensors are placed on the drilling rig 10 to take measurement of the drilling equipment. In particular hookload is measured by hookload sensor 94 mounted on deadline 77, block position and the related block velocity are measured by block sensor 95 which is part of the draw works 70. Surface torque is measured by a sensor on the rotary table 88. Standpipe pressure is measured by pressure sensor 92, located on standpipe 86. Additional sensors may be used to detect whether the drill bit 54 is on bottom. Signals from these measurements are communicated to a central surface processor 96. In addition, mud pulses traveling up the drillstring are detected by pressure sensor 92.

Pressure sensor 92 comprises a transducer that converts the mud pressure into electronic signals. The pressure sensor 92 is connected to surface processor 96 that converts the signal from the pressure signal into digital form, stores and demodulates the digital signal into useable MWD data. According to various embodiments described above, surface processor 96 is programmed to automatically detect the most likely rig state based on the various input channels described. Processor 96 is also programmed to carry out the automated event detection as described above. Processor 96 preferably transmits the rig state and/or event detection information to user interface system 97 which is designed to warn the drilling personnel of undesirable events and/or suggest activity to the drilling personnel to avoid undesirable events, as described above. In other embodiments, interface system 97 may output a status of drilling operations to a user, which may be a software application, a processor and/or the like, and the user may manage the drilling operations using the status.

Processor 96 may be further programmed, as described below, to interpret the data collected by the various sensors provided to provide an interpretation in terms of activities that may have occurred in producing the collected data. Such interpretation may be used to understand the activities of a driller, to automate particular tasks of a driller, to provide suggested course of action such as parameter setting, and to provide training for drillers.

In the hydrocarbon industry it is often desirable to automate, semi-automate and/or the like operations to remove, mitigate human error, to increase speed and/or efficiency, allow for remote operation or control, lessen communication obstacles and/or the like. Moreover, in the hydrocarbon industry sensors are commonly deployed to gather data to provide for monitoring and control of the systems related to hydrocarbon capture and/or the like.

In the process of drilling a borehole a plurality of sensors are used to monitor the drilling process—including the functioning of the drilling components, the state of drilling fluids or the like in the borehole, the drilling trajectory and/or the like—characterize the earth formation around or in front of the location being drilled, monitor properties of a hydrocarbon reservoir or water reservoir proximal to the borehole or drilling location and/or the like.

To analyze the multitude of data that may be sensed during the drilling process, averaging or the like has often been used to make statistical assumptions from the data. Such averaging analysis may involve sampling sensed data periodically and then statistically analyzing the periodic data, which is in effect a looking backwards type analysis. Averaging may also involve taking frequent or continuous data and making assessments from averages/trends in the data.

Most analysis of data captured in the hydrocarbon industry is moving window analysis, i.e., a window of data is analyzed using the same assumptions/as a whole without consideration as to whether a change has occurred requiring separate analysis of different portions of the window of data. If small data windows are selected to try and avoid/mitigate the effect of changes on the data being analyzed, the small windows often give rise to large amounts of "noise" in the data. To avoid the moving window problem, Kalman filters have been used, however such filters can only smooth out effects of changes, especially abrupt changes, on the data, and may provide for incorrect analysis of essentially steady state data in which changes are not occurring. In embodiments of the present invention, real-time analysis of the data is provided by identifying and/or processing changepoints in the data.

Figure 2:
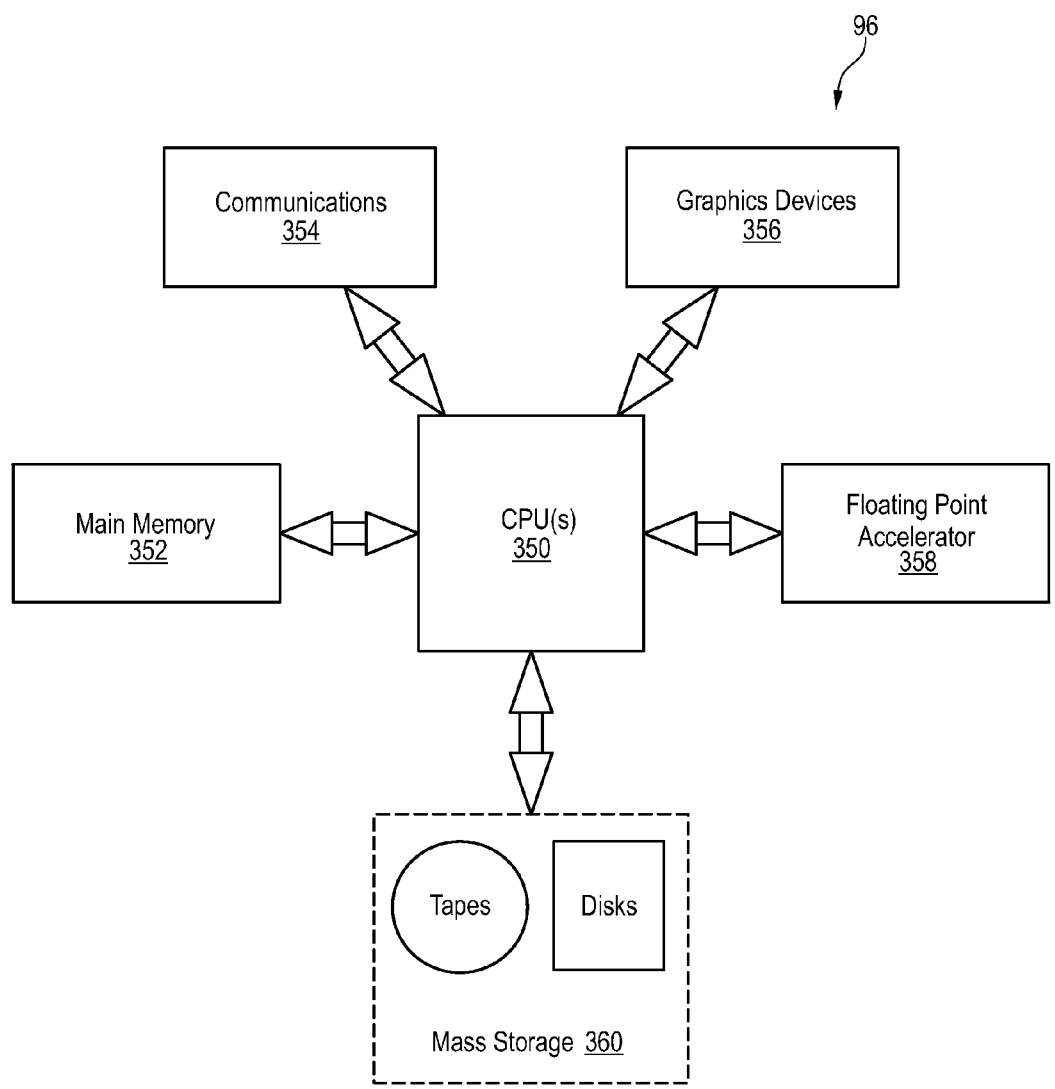
FIG. 2 shows detail of a processor for processing data to automate hydrocarbon processes, for example, oilfield drilling processes as shown in FIG. 1, according to one embodiment of the present invention.

FIG. 2 shows further detail of processor 96, according to preferred embodiments of the invention. Processor 96 preferably consists of one or more central processing units 350, main memory 352, communications or I/O modules 354, graphics devices 356, a floating point accelerator 358, and mass storage such as tapes and discs 360. It should be noted that while processor 96 is illustrated as being part of the drill site apparatus, it may also be located, for example, in an exploration company data center or headquarters. It should be noted that many alternative architectures for processor 96 are possible and that the functionality described herein may be distributed over multiple processors. All such alternatives are considered equivalents to the architecture illustrated and described here.

Data collected by various sensors in industrial processes are often very noisy. Such noise may cause real-time human interpretation of the data near impossible. Furthermore, calculations based on individual datapoints may amplify the effect of the noise.

Figure 3:
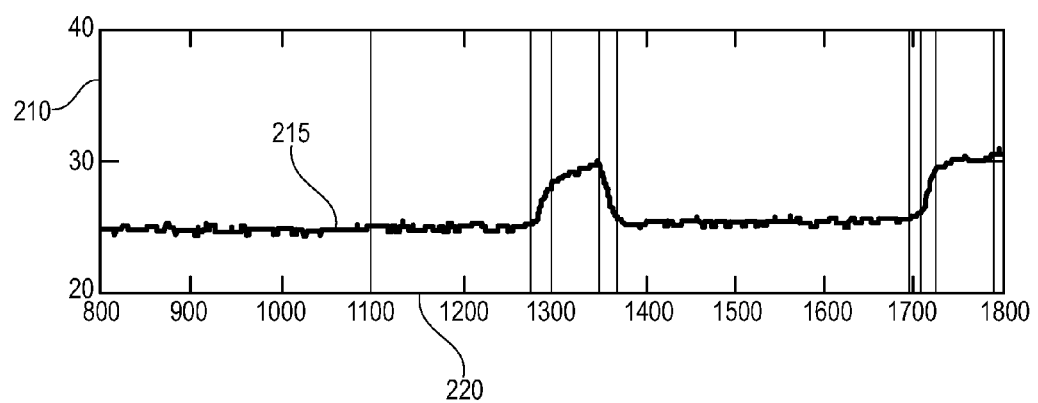
FIG. 3 is a graph illustrating changes in volume of a mud pit employed in a drilling operation including two distinct changes in volume indicative of a change in operating condition during a wellbore drilling process, which change may be used in a processor for processing data to automate hydrocarbon processes according to one embodiment of the present invention.
Figure 4A:
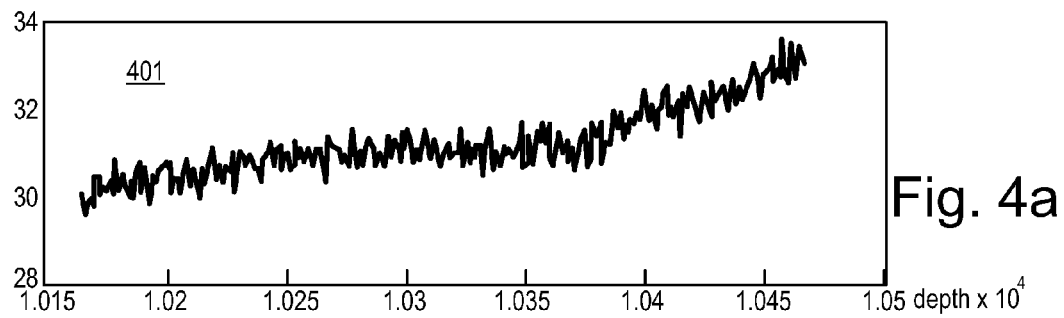
FIGS. 4a-d, is a set of graphs illustrating inclination and azimuth measurements obtained during a portion of a directional drilling operation which change may be used in a processor for processing data to automate hydrocarbon processes according to one embodiment of the present invention.
Figure 4B:
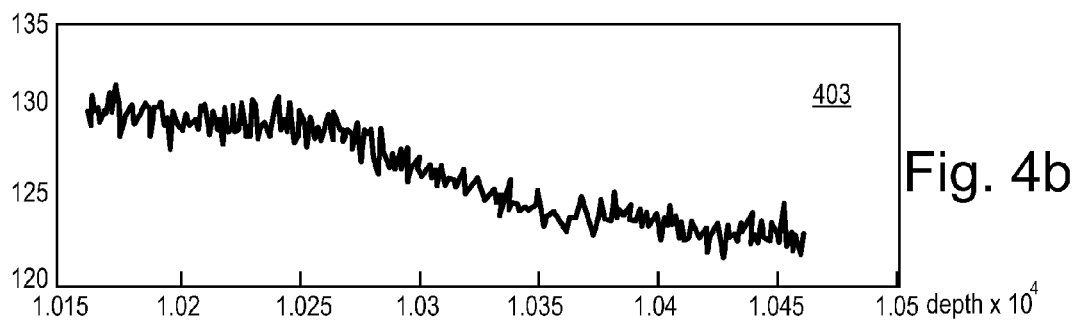
Figure 4C:
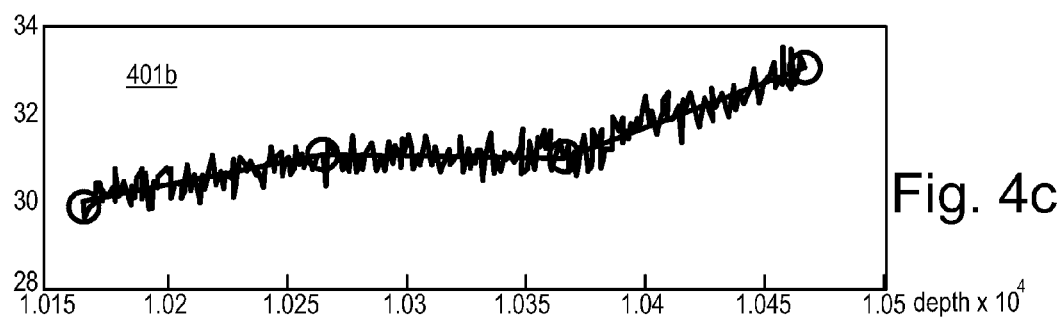
Figure 4D:
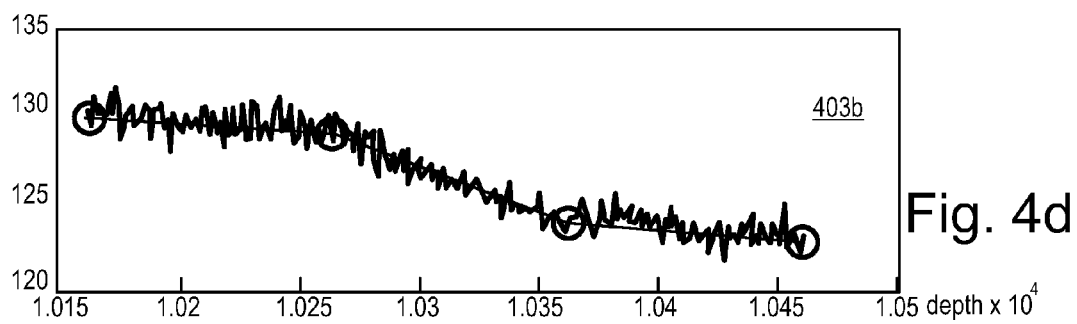
Figure 5:
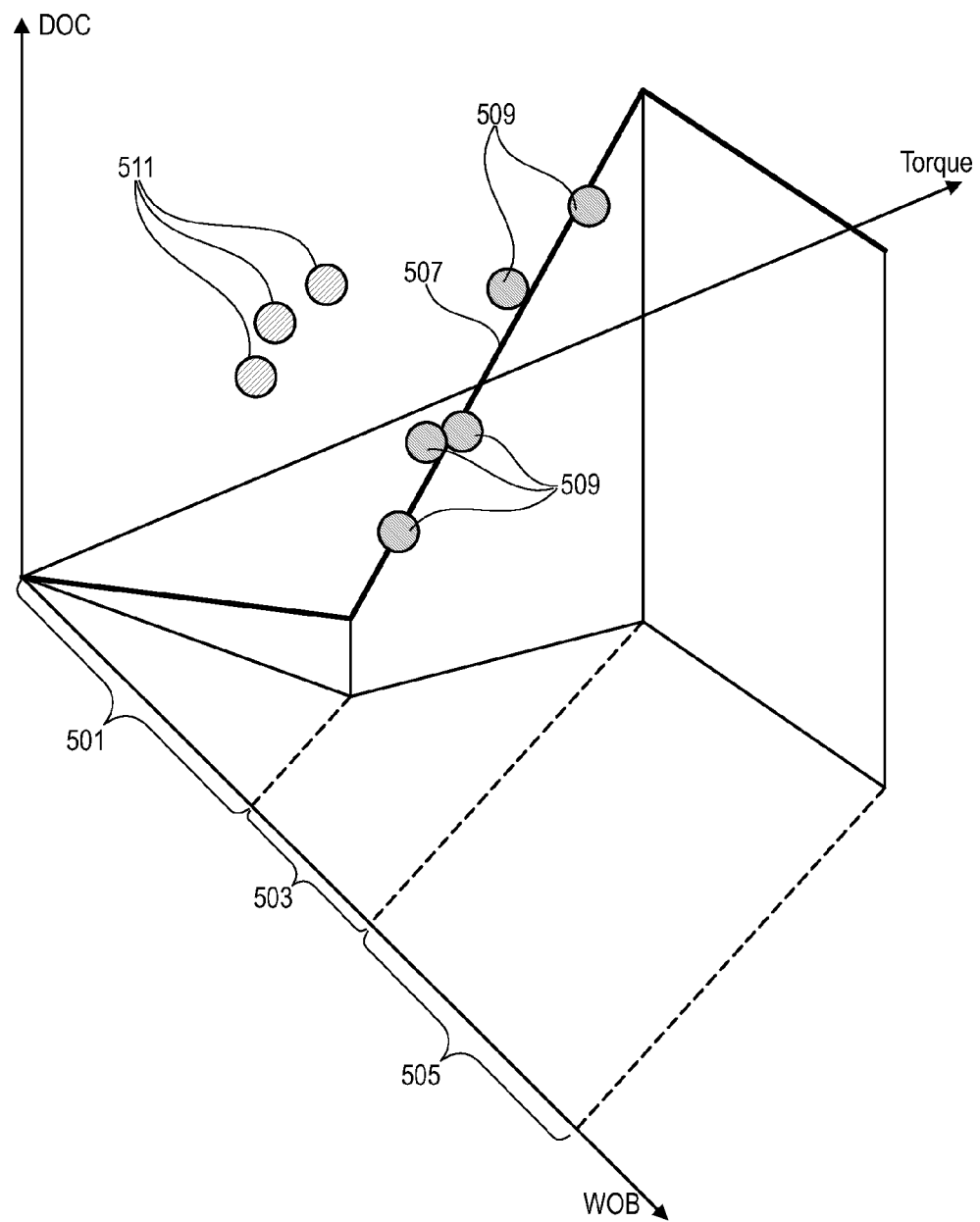
FIG. 5 is a three-dimensional graph illustrating differences in the linear response in a drill bit model, the drill bit comprising polycrystalline diamond compact cutters (hereinafter a "PDC bit"), for two different lithologies which change may be used in a processor for processing data to automate hydrocarbon processes according to one embodiment of the present invention.

FIGS. 3 through 5 are illustrations of various examples of data that may be encountered in the process of drilling wells in the exploration for subterranean resources such as oil, gas, coal, and water.

FIG. 3 shows pit volume data 215 changing with time in a process of drilling a wellbore 46. In the process of drilling a wellbore 46, a drilling fluid called mud is pumped down the central opening in the drill pipe and passes through nozzles in the drill bit 54. The mud then returns to the surface in the annular space between the drill pipe 58 and the inner-wall of the borehole 46 and is returned to the mud pit 78, ready for pumping downhole again. Sensors measure the volume of mud in the pit 78 and the volumetric flow rate of mud entering and exiting the well. An unscheduled influx of formation fluids into the wellbore 46 is called a kick and is potentially dangerous. The kick may be detected by observing that flow-out is greater than flow-in and that the pit volume has increased.

In FIG. 3, a pit volume data signal 215 is plotted against a time axis 220. The pit volume data signal 215 is measured in [m3] and illustrated on a volume axis 210. During the drilling process, a kick may be observed in the data at around t=1300 and t=1700 time on the time axis 220. The kick is identifiable in the pit volume data signal 215 as a change in the gradient of the pit volume data signal 215. It is desirable to detect these kicks automatically and to correlate the occurrence of kicks with other events taking place in the drilling operation, e.g., changes in rig state.

FIG. 4, which comprises FIGS. 4a-d, is a set of graphs illustrating inclination 401 and azimuth 403 measurements obtained during a portion of a directional drilling operation. Inclination 401 and azimuth 403 measurements are useful to a driller in adjusting the drilling operation to arrive at particular target formations. The driller uses these measurements to predict whether the desired target is likely to be intersected and may take corrective actions to parameters such as weight-on-bit and drilling-rotational-speed to cause the drilling trajectory to change in the direction of the target if necessary.

As may be seen in FIG. 4 both the continuous inclination data channel 401 and the continuous azimuth data channel have rather noisy data. Yet examination of the data reveals certain trends illustrated by the segmented straight lines superimposed on the raw data in FIGS. 4C & 4D, respectively. For example, in the inclination data 401b, the data seems to follow a ramp from depth $\approx 1.016 \times 10^4$ to depth $\approx 1.027 \times 10^4$, followed by a step to depth $\approx 1.0375 \times 10^4$, and another ramp to $\approx 1.047 \times 10^4$. For determination of the curvature of the well ("dogleg severity") and direction of the curvature ("toolface"), it would be preferable to use models reflecting these steps and ramps than any one data point in the data stream. Conversely, using such models would be preferable to the traditional way of taking stationary measurements at 30 foot or 90 foot intervals because calculations based models based on the steps and ramp models of the data may be used in real-time, not require taking the drilling operation off-bottom, and may provide dogleg severity and toolface calculations at relatively short intervals.

FIG. 5 is yet another graphical illustration of how changes in lithology may affect drilling operations, in this case, the bit response of a PDC (Polycrystalline diamond compact) bit in the three-dimensional space defined by weight-on-bit ("WOB"), depth-of-cut ("DOC"), and torque. The expected bit response in that space is described in Detournay, Emmanuel, Thomas et al., *Drilling Response of Dragbits: Theory and Experiment*, International Journal of Rock Mechanics & Mining Sciences 45 (2008): 1347-1360. The bit response tends to have three phases with respect to the WOB applied. Each phase has a relatively linear bit response.

In a first phase 501, with low WOB applied, very low depth of cut is achieved. At low WOB most of the interaction between the bit 54 and rock occurs at the wear flats on the cutters. Neither the rock surface nor the wear flat will be perfectly smooth, so as depth of cut increases the rock beneath the contact area will fail and the contact area will enlarge. This continues until a critical depth of cut where the failed rock fully conforms to the geometry of the wear flats and the contact area grows no larger. Next, a second phase 503 corresponds to an intermediate amount of WOB. In this phase 503, beyond a critical depth of cut, any increase in WOB translates into pure cutting action.

The bit incrementally behaves as a perfectly sharp bit until the cutters are completely buried in the rock and the founder point is reached. The third phase 505 is similar to the first phase 501 in that little is gained from additional WOB. The response past the founder point depends on how quickly the excess WOB is applied. Applied rapidly, the uncut rock ahead of the cutters will contact with the matrix body of the bit and act in a similar manner to the wear flats in Phase I, so depth of cut will increase slightly with increasing WOB. Applied slowly, the cuttings may become trapped between the matrix and the uncut rock, so depth of cut may decrease with increasing WOB. Drillers prefer to operate near the top of the second phase with the optimal depth of cut achieved without wasting additional WOB.

Depth of cut per revolution can be estimated by dividing ROP by RPM, so real-time drilling data can be plotted in the three dimensional {WOB, bit torque and depth of cut} space as illustrated in FIG. 5. As the bit drills into a new formation, the response will change abruptly and the points will fall on a new line. The plotted line 507 illustrates a model of the bit response for a first formation corresponding to collected data points 509. On the other hand, data points 511 correspond to data collected in a different formation from the data points 509. If the second set (511) correspond to data encountered after the first set (509), a change in formation and ancillary operating conditions may have occurred.

A straight line in three dimensions has four unknown parameters, two slopes and the intersection with the x-y plane, i.e., WOB-torque plane in this case. These parameters could be estimated with a least squares fit to a temporal or spatial sliding window, e.g., last five minutes or last ten feet of data, but this would provide very poor fits in the vicinity of formation boundaries. For example, in FIG. 5, plotting a straight line through both the points of the first set (509) and points of the second set (511) would yield bizarre model parameters.

The PDC bit models have successfully been applied in the field by manual inspection of the data and breaking it up into homogeneous segments, e.g., in FIG. 5, a straight line is fitted to the data points 509 only and a second straight line (not shown) may be fitted to the data points 511 only, thereby avoiding the cross-class polluted estimates produced by a moving window. While in a simplified example as illustrated in FIG. 5 it is possible to visually see that the data points 511 and the data points 509 lie/occur on different lines, with real world data, this is a labour intensive process that hitherto has prevented application of the PDC bit model in controlling drilling systems/procedures.

Consider now again FIGS. 4A & 4B. As discussed hereinabove, the data may be segmented into three different segments and each segment having associated therewith a model particularly useful for modeling the data in that segment. In a preferred embodiment of the invention, the data is modeled using either ramp or step functions, for example, using the least squares algorithm, and these models are evaluated using Bayesian Model Selection. Bayesian Model Selection is discussed in detail in Deviderjit Sivia and John Skilling, *Data Analysis: A Bayesian Tutorial* (OUP Oxford, 2 ed. 2006), the entire contents of which is incorporated herein by reference. Thus, for each segment of each segmentation, a model that is either a ramp or a step is assigned and the corresponding segmentations are assigned a weight indicative of how well the segmentation and associated models conform to the data stream as compared to other segmentations.

In embodiments of the present invention, online data analysis may be provided by treating incoming data as being composed of segments between which are changepoints. The changepoints may be identified by the data analysis to provide for detection in changes in the automated industrial process. In certain aspects, a plurality of sensors or the like may provide a plurality of data channels that may be segmented into homogeneous segments and data fusion may be used to cross-correlate, compare, contrast or the like, changepoints in the incoming data to provide for management of the automated industrial procedure.

In an embodiment of the present invention, the data may be analyzed in real-time to provide for real-time detection, rather than retrospective, detection of the changepoint. This real-time detection of the changepoint may be referred to as online analysis/detection. In an embodiment of the present invention, the data from one or more sensors may be fitted to an appropriate model and from analysis of the incoming data with regard to the model changepoints may be identified. The model may be derived theoretically, from experimentation, from analysis of previous operations and/or the like.

As such, in an embodiment of the present invention, data from an automated industrial process may be analyzed in an online process using changepoint modeling. The changepoint models divide a heterogeneous signal, in an embodiment of the present invention the signal being data from one or more sources associated with the hydrocarbon related process, into a sequence of homogeneous segments. The discontinuities between segments are referred to as changepoints.

Merely by way of example, an online changepoint detector in accordance with an embodiment of the present invention, may model the data in each homogeneous segment as a linear model, such as a ramp or step, with additive Gaussian noise. Such models are useful when the data has a linear relationship to the index. In alternative embodiments, more complex models may be employed, e.g., exponential, polynomial and trigonometric functions. As each new sample (set of data) is received, the algorithm outputs an updated estimate of the parameters of the underlying signal, e.g., the mean height of steps, the mean gradient of ramps and the mean offset of ramps, and additionally the parameters of the additive noise (for zero-mean Gaussian noise, the parameter is the standard deviation or the variance, but for more general noise distributions other parameters such as skewness or kurtosis may also be estimated).

If so chosen, a changepoint may be designated where the noise parameters are found to have changed. In some embodiments of the present invention, the tails of a distribution are may be considered in the analysis, as when analyzing the risk of an event occurring the tails of the distribution may provide a better analytical tool than the mean of the distribution. In an embodiment of the present invention, the changepoint detector may be used to determine a probability that the height/gradient/offset of the sample is above/below a specific threshold.

A basic output of the changepoint detector may be a collection of lists of changepoint times and a probability for each list. The most probable list is thus the most probable segmentation of the data according to the choice of models: G1, . . . , Gj.

The segmentation of the signal may be described using a tree structure (see FIG. 7) and the algorithm may be considered as a search of this tree. At time 0 (before any data has arrived) the tree consists of a single root node, R. At time 1 the root node spawns J leaves, one leaf for each of the J segment models—the first leaf represents the hypothesis that the first data point is modeled with $G_1$, the second leaf hypothesises is $G_2$, etc. At subsequent times, the tree grows by each leaf node spawning J+1 leaves, one for each model and an extra one represented by 0, which indicates that the data point at the corresponding time belongs to the same model segment as its parent. For example, if $G_1$ were a step model and $G_2$ were a ramp, a path through the tree from the root to a leaf node at time 9 might be:

R 100000200 where this would indicate that the first six samples were generated by a step and that the remaining four samples were generated by a ramp.

Over time the tree grows and it is searched using a collection of particles each occupying a distinct leaf node. The number of particles may be chosen by the user/operator and around 20-100 is may be sufficient, however other amounts of particles may be used in different aspects of the present invention. Associated with a particle is a weight, which can be interpreted as the probability that the segmentation indicated by the path from the particle to the root (as in the example above) is the correct segmentation. The objective of the algorithm is to concentrate the particles on leaves that mean the particle weights will be large.

Figure 6:
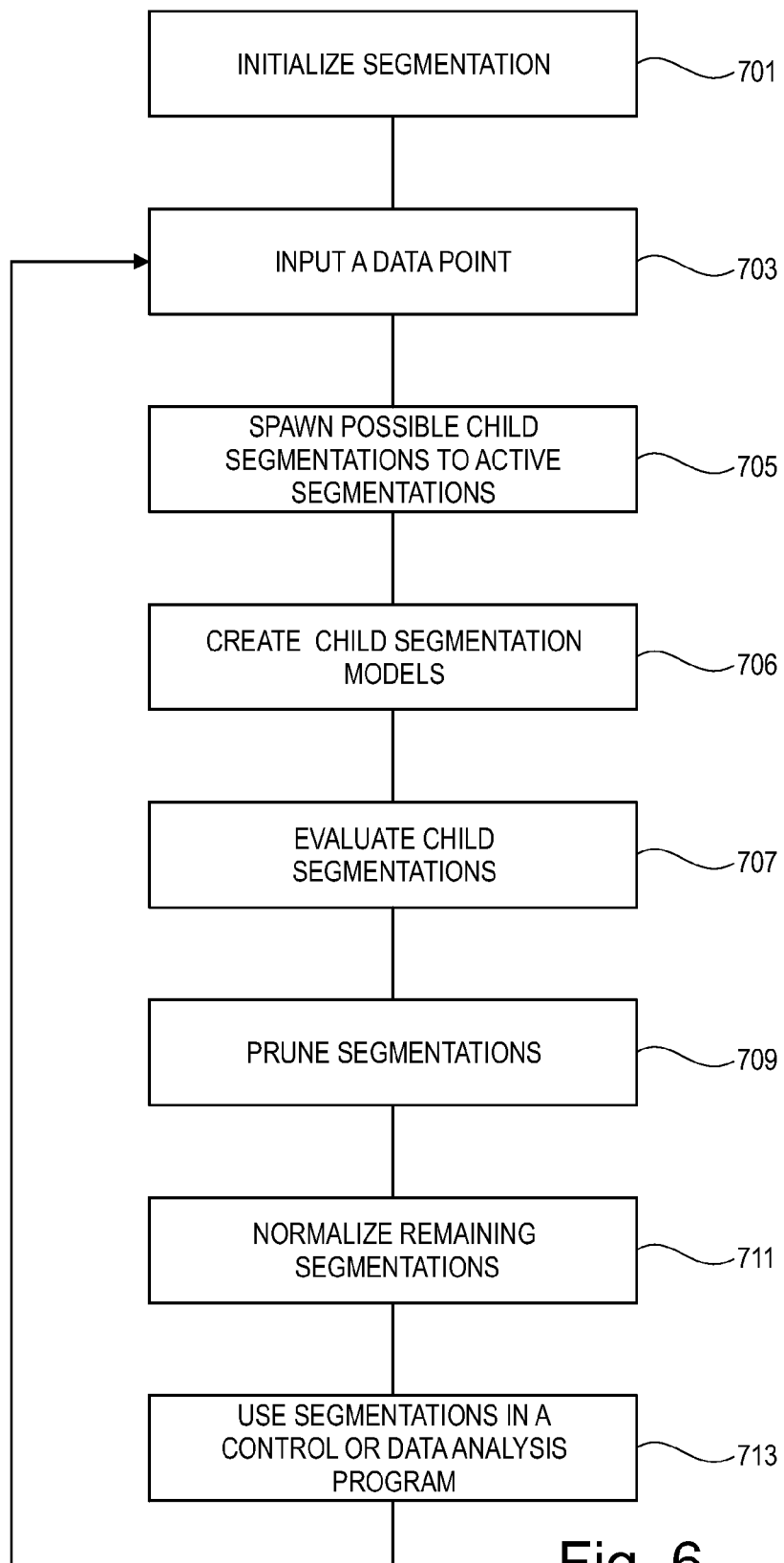
FIG. 6 is a flow-diagram illustrating an embodiment of the present invention for obtaining segmentations of data streams that may include changepoints.
Figure 7:
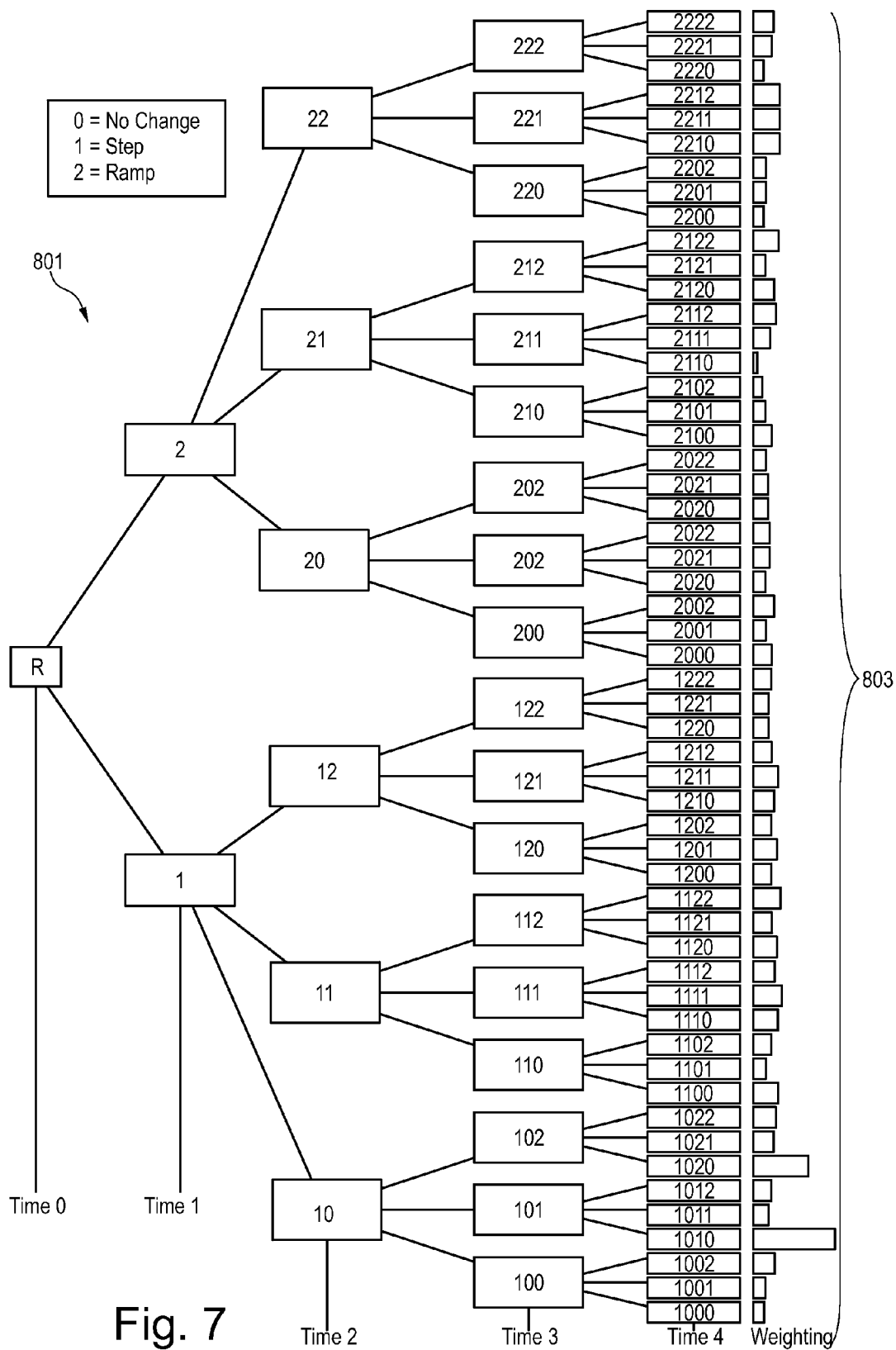
FIG. 7 is an illustration of a tree data structure showing four-levels of data modeling corresponding to four data points and weights associated with the various segmentations illustrated therein, according to one embodiment of the present invention.

FIG. 6 is a flow-diagram illustrating an embodiment of the present invention for obtaining segmentations of data streams that may include changepoints. The segmentation process for determining changepoints and associated models successively builds a tree data structure, an example of which is illustrated in FIG. 7, wherein each node in the tree represents different segmentations of the data. The tree is also periodically pruned to discard low-probability segmentations, i.e., segmentations that have a poor fit to the data.

In a first step, the segmentations are initialized by establishing a root node R, step 701. Next a data point is received from one or more input streams, step 703. In response the segmentation process spawns child segmentations, step 705, that reflect three different alternatives, namely, a continuation of the previous segment, a new segment with a first model, or a new segment with a second model (while we are in this example describing an embodiment with two models, ramp and step, in alternative embodiments, additional models may be included). In an embodiment of the present invention, illustrated and described herein, the alternative models are ramp and step functions. As the root node does not represent any model, the first generation in the tree, reflecting the first data point, must start a new segment which is either a ramp, which is represented in the tree as 1, or a step, which is represented in the tree as 2.

In the example given above, the particle R 100000200 would produce three new child nodes with corresponding particles:

R 1000002000
R 1000002001
R 1000002002

The first of which indicates a continuation of the step segment that begins with the 7th data point, the second, a new ramp, and the third, a new step.

Models are then created by fitting the data in the new segments to the designated models for the segments and models corresponding to existing segments are refit, step 706. For example, if a new ramp segment is to be created for a new child particle, the data in the segment is fit to that ramp. Naturally, when a new segment is created, the corresponding model that is assigned is merely a function that puts the model value through the new data point. However, for existing segments in which the segment encompasses a plurality of data points, the model parameters, e.g., the parameters defining the gradient and offset of a ramp, are re-evaluated. Some form of linear regression technique may be used to determine the linear function to be used to model the data in the segment as a ramp or step.

The segmentations produced are next evaluated, step 707, using Bayesian Model Selection or the like to calculate weights indicative of how good a fit each segmentation is for the underlying data.

After the segmentations, creation of model functions, and corresponding models have been evaluated, i.e., having had weights assigned thereto, the tree is pruned by removing some particles from future consideration and to keep the particle population size manageable, step 709. The weights of the remaining particles are normalized, step 711.

Having evaluated the segmentations of the input data stream, the segmentations and corresponding models may be used in a process control program or in a further data analysis program, step 713. The use of the segmentations and corresponding models may take several forms. For example, the remaining segmentations may each be used to evaluate the input data in the calculation of a quantity used to compare against a threshold value for the purpose of alerting of a condition to which some corrective action should be taken. In such a scenario, a weighted average (weighted by the weights associated with each segmentation) may be computed to determine the probability that the condition has or has not occurred. This probability may either be used to trigger an action or suggest an action, or as input into further condition analysis programs.

Figure 8:
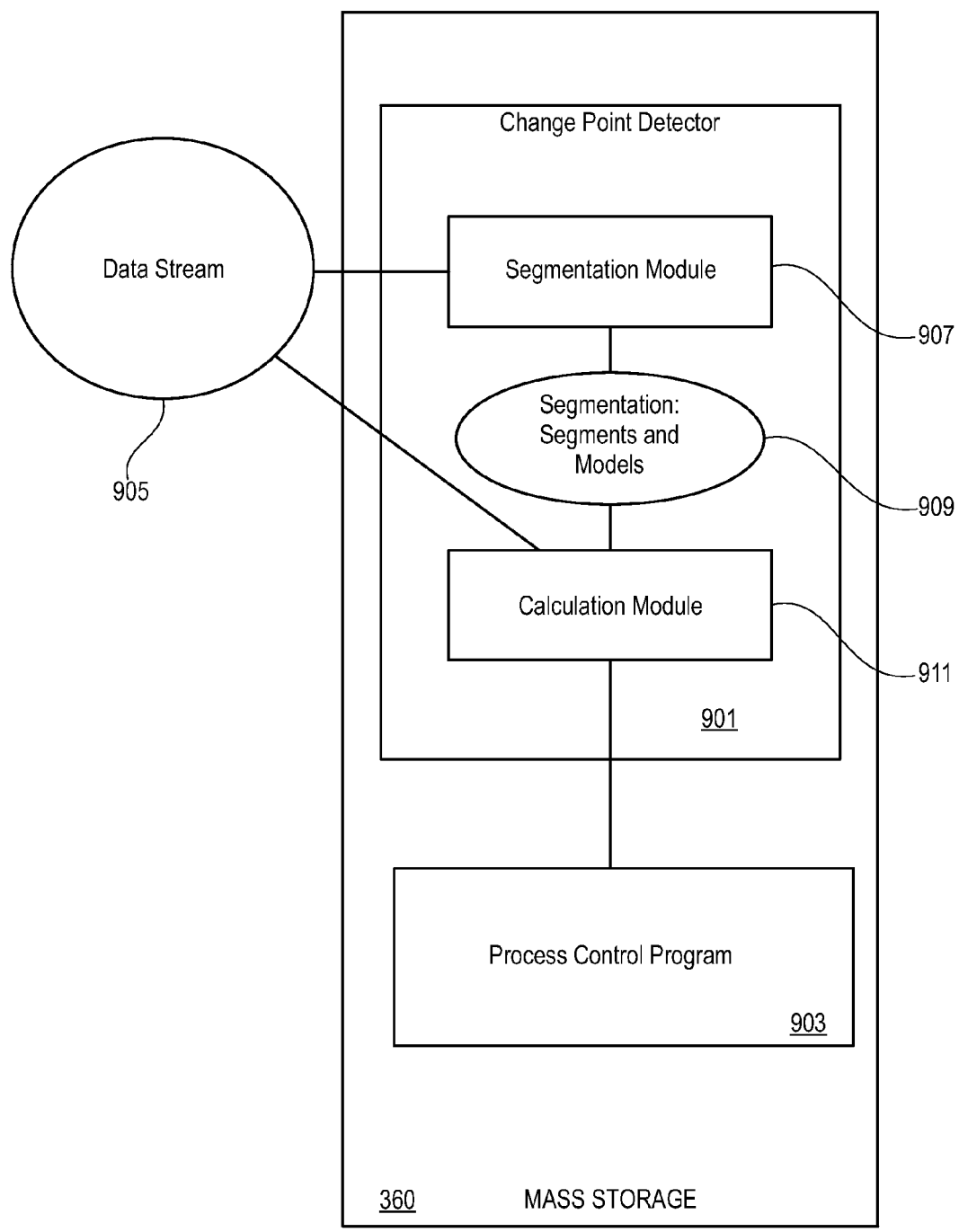
FIG. 8 is a block diagram of a software architecture for one embodiment of the present invention fir using a changepoint detector described herein in conjunction with a process control program.

FIG. 8 is a block diagram illustrating a possible software architecture using changepoint detection as described herein. A changepoint detector module 901 and a process control program 903 may both be stored on the mass storage devices 360 of computer system 96 used to receive and analyze sensor data obtained from a drilling operation, and for control of the drilling operation. The changepoint detector module 901 contains computer instructions processable by the CPU 350 to provide calculations as described herein, for example, the process flow set forth in FIG. 6. These instructions cause the CPU 350 to receive data from a data stream 905 from one of the various sensors on the drilling rig, or other industrial process.

The input data is processed by the CPU 350 according to instructions of a segmentation module 907 to produce segmentations 909 of the data as described herein. These segmentations contain segments defined by intervals of an index of the data stream, and models associated with those segments. The segments are fed into a calculation module to provide a result from the changepoint detector 901 that in turn is an input to the process control program 903. The result may be a probability of an event having occurred or some other interpretation of the input data (e.g., toolface or dogleg severity), or even a recommended action (e.g., suggested change in drillbit rotational speed or weight on bit to obtain better rate of penetration).

A more detailed view of FIG. 7, which is a graphical depiction of the segmentation tree 801 and weights 803 associated with the active particles after four time indexes, is now provided. As noted above, to arrive at a segmentation, the changepoint detector 901 uses a system of particles and weights. From, Time 0 (which is represented by the root node R) to Time 1, two particles ("1" and "2") are spawned (Step 705); the first one ("1") representing a step and the second ("2") representing a ramp. At Time 2 (and each subsequent time index), each of the currently active particles spawns three particles, the first representing no change ("0"), the second representing a step ("1") and the third representing a ramp ("2"), thus producing the particles 10, 11, 12, 20, 21, and 22. This continues for each time index and at Time 4 the tree has grown to 54 particles. For each active particle, i.e., a particle that was spawned at the latest index and that has not been removed through the pruning step (Step 709), a weight is determined (Step 707 and Step 711). These weights are illustrated graphically in FIG. 7 in the weight bar chart 803. The weights are used to prune the tree 801 by removing the lowest weight particles when the number of particles exceed a preset maximum.

As noted in the discussion of FIG. 6, when the weights for the remaining active particles have been determined and normalized, the resulting segmentations are used in conjunction with a control program 713.

Figure 9A:
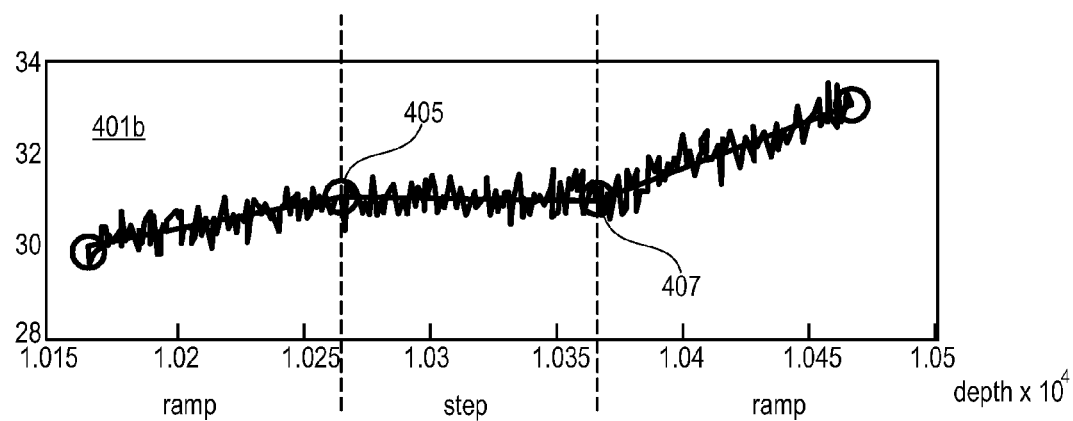
FIGS. 9a-b, is a set of graphs illustrating possible segmentations for the inclination and azimuth measurements of FIG. 4, according to one embodiment of the present invention.
Figure 9B:
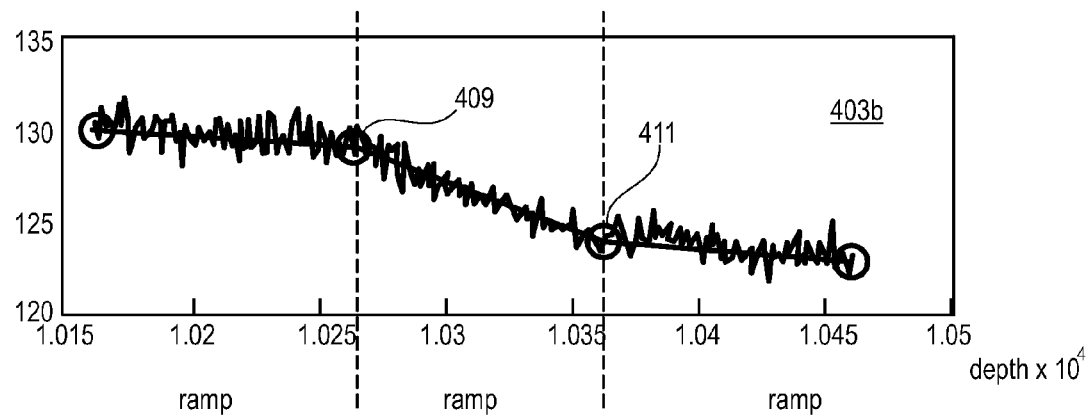

Consider by way of example again the inclination 401$a$ and azimuth 403$a$ input streams from FIG. 4. FIG. 9, which comprises FIGS. 9$a$-$b$, is a set of graphs illustrating changepoints identified by the changepoint detector 901 and the associated models. For example, in the inclination stream 401$b$, the changepoint detector 901 identifies changepoints 405 and 407, in addition to changepoints at the start and end of the data set. Similarly, in the azimuth data stream 403$b$, the changepoint detector 901 identifies changepoints 409 and 411. For the inclination stream, the changepoint detector 901 has fit a ramp for the segment up to the first changepoint 405, followed by a step up to the second changepoint 407, and finally a ramp for the data following the second changepoint 407. On the other hand, for the azimuth datastream 403$b$, the changepoint detector 901 has fit three successive ramps, each having different gradient.

As the above paragraphs illustrate, there are many processes relating to the drilling of a hydrocarbon well or operation of any other hydrocarbon related procedure in which data that is indicative of operating environment is subject to difficult interpretation due to noise or other factors, yet where that data and changes in the operating environment that the data reflects may have significant effect on how an operator of the drilling of the hydrocarbon well or operation of the hydrocarbon related procedure would set parameters for optimal process performance or where the such data, if modeled accurately, may be very useful in automation of aspects of the creation/operation of the hydrocarbon well.

We now turn to three examples of the use of the changepoint detector 901 in conjunction with a control program 903.

In a first example, the changepoint detector 901 is used to determine kicks encountered in a drilling operation. In the process of drilling a wellbore, a drilling fluid called mud is pumped down the central opening in the drill pipe and passes through nozzles in the drill bit. The mud then returns to the surface in the annular space between the drill pipe and borehole wall and is returned to the mud pit, ready for pumping downhole again. Sensors measure the volume of mud in the pit and the volumetric flow rate of mud entering and exiting the well. An unscheduled influx of formation fluids into the wellbore is called a kick and is potentially dangerous. The kick may be detected by observing that flow-out is greater than flow-in and that the pit volume has increased.

FIG. 3 is a graphical depiction of pit volume data changing with time in a process of drilling a wellbore. In FIG. 3, a pit volume data signal 215 is plotted against a time axis 220. The pit volume data signal 215 is measured in cubic meters ($m^3$) and illustrated on a volume axis 210. The pit volume signal is indicative of kicks at two locations, at around t=1300 and t=1700. For the sake of discussion, suppose that during the drilling process, a kick was manually detected for the second of these at around the t=1700 time on the time, axis 220 and that the increase in pit volume at t=1300 is due to a connection of drilling pipe. The kick is identifiable in the pit volume data signal 215 as a change in the gradient of the pit volume data signal 215.

Figure 10A:
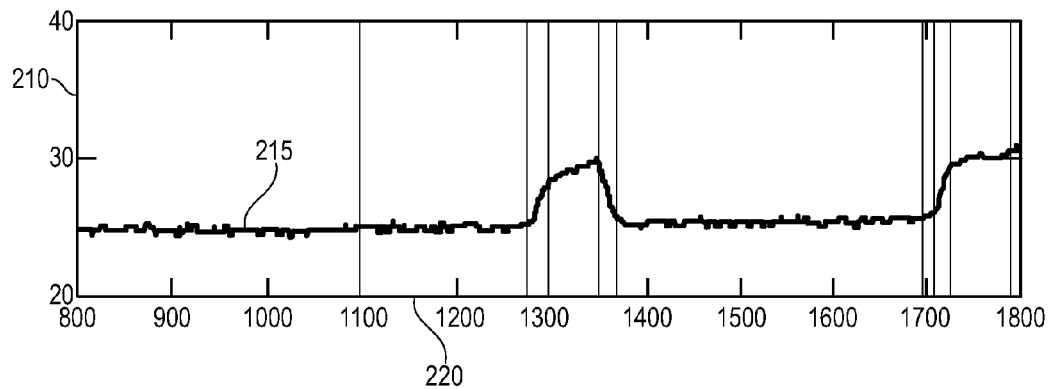
FIGS. 10a-c, is a set of graphs illustrating the output calculated by the changepoint detector for determining the probability of a kick from the data stream shown in FIG. 3, according to one embodiment of the present invention.
Figure 10B:
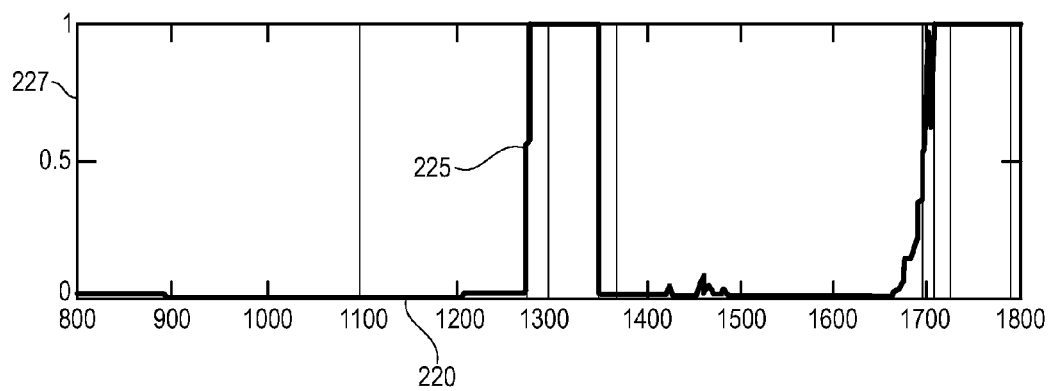

FIG. 10, which comprises FIGS. 10$a$-$c$, is a set of graphs illustrating the application of the changepoint detector 901 to the pit-volume data of FIG. 3 (for the convenience of the reader, FIG. 3 is replicated in FIG. 10 as FIG. 10A), in accordance with an embodiment of the invention. FIG. 10B is a graphical illustration of the output from the changepoint detector 901. The changepoint detector 901 processes homogeneous segments of the pit volume data 215 from FIG. 10A. Using these homogeneous segments the changepoint detector 901 produces an output signal indicative of the probability 225 that a ramp in the pit volume data 215 has a gradient greater than 0.001 $m^3$/s. The probability 225 is plotted against the time axis 220 and a probability axis 227 that provides for a zero to unity probability.

Figure 10C:
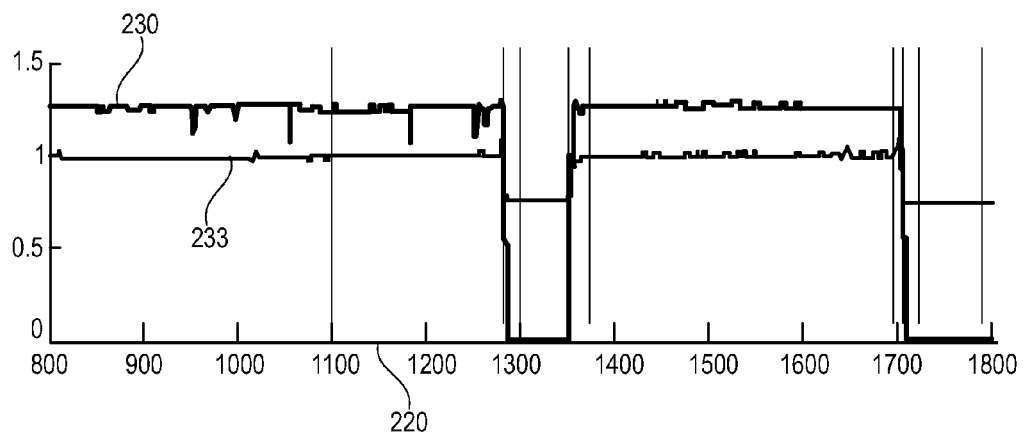
Figure 11:
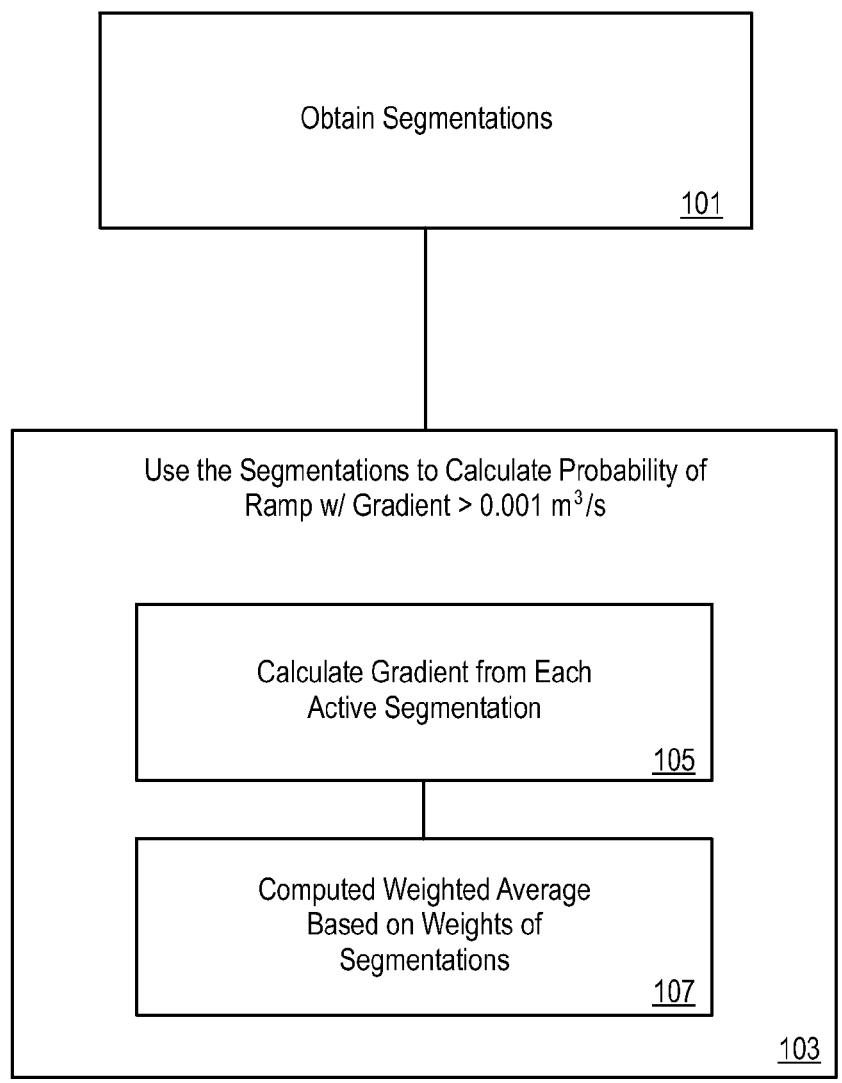
FIG. 11 is a flow-chart illustrating the operation of the changepoint detector to determine the probability of a ramp having a value greater than a given threshold, according to one embodiment of the present invention.

FIG. 11 is a flow-chart illustrating the operation of the changepoint detector 901 to determine the probability of a ramp having a value greater than a given threshold. Applying the method described in conjunction with FIGS. 6 and 7, the changepoint detector 901 determines possible segmentations and assigns weights to these segmentations, step 101. In the example of FIG. 10, step 101 would have arrived at a number of segmentations, likely including segmentations that indicate steps from t=800 to t=1280 and a ramp from t=1280 to t=1300. Because such a segmentation would have a good fit to the data, that segmentation would have a very high weight.

Next the calculation module 911 uses the segmentations to calculate a desired probability value, step 103. In the present example, that probability is the probability of the ramp of the pit volume data exceeds a given threshold, namely, for the purposes of the example, 0.001 $m^3$/s. That result is obtained by calculating the gradient from the models corresponding to each active segmentation, step 105, and computing a weighted average over those results based on the weight associated with each segmentation. If one of the possible segmentations under consideration represented a continuation of the model from t=800 which has a very low ramp or even a step, once the volume data starts increasing at t=1300 (and similarly at t=1700) that model would be a poor fit and have a very low weight associated with it. Therefore, at t=1300, the weighted average calculation would give the segmentation that includes a ramp beginning at t=1280 a very large weight and that segmentation would have a high influence on the weighted average calculation and the final result.

In FIG. 10B, the probability 225 approaches unity around the time the kick may be manually identified in the pit volume data 215 in FIG. 10A. As such, the changepoint detector of the present invention may provide for using probabilistic gradient analysis of data retrieved during a drilling process to determine in real-time the occurrence of a kick or the like.

FIG. 10C illustrates flow-in and flow-out data corresponding to the pit volume data of FIG. 10A for the drilling process. As illustrated, flow-in data 230 and flow-out-data 233 for the wellbore drilling operation is plotted against the time axis 220. The flow-in/flow-out data is not used in the changepoint detection method illustrated in FIG. 10B. However, it may be seen that there is a fluctuation in the data at time, t=1700, that corresponds to the kick that the changepoint detector of FIG. 10B seeks to detect.

The changepoint detector of FIG. 10B may have the following characteristics:

(a) The probability analysis for the changepoint detector may also approaches unity when a connection of a drilling pipe is made at time t=1300.

(b) When the circulation of the system is not at steady-state, the pit volume may be affected by flowline delays and wellbore ballooning.

(c) Thresholding of the gradient of pit volumes may be somewhat arbitrary. To analyze the automated drilling process in real-time, shallow gradients of the received data over long durations may be as determinative in the analysis process as steep gradients received over short durations. As such, since the height of the ramp is the volume of the influx, it may be preferable to threshold, base real-time analysis, upon this statistic.

(d) The kick may also be seen in the flow data associated with the drilling process, shown in FIG. 10C. However, the gradient algorithm does not use this additional data.

To take the additional information available from drilling process into account, the output from the changepoint detector may be fed into additional analysis software for fusing the changepoint detector output with such additional information. For example, the changepoint detector output may be one input to a Bayesian Belief Network used to combine that output with detection of changes in rig state, i.e., the current state of the drilling rig.

Figure 12:
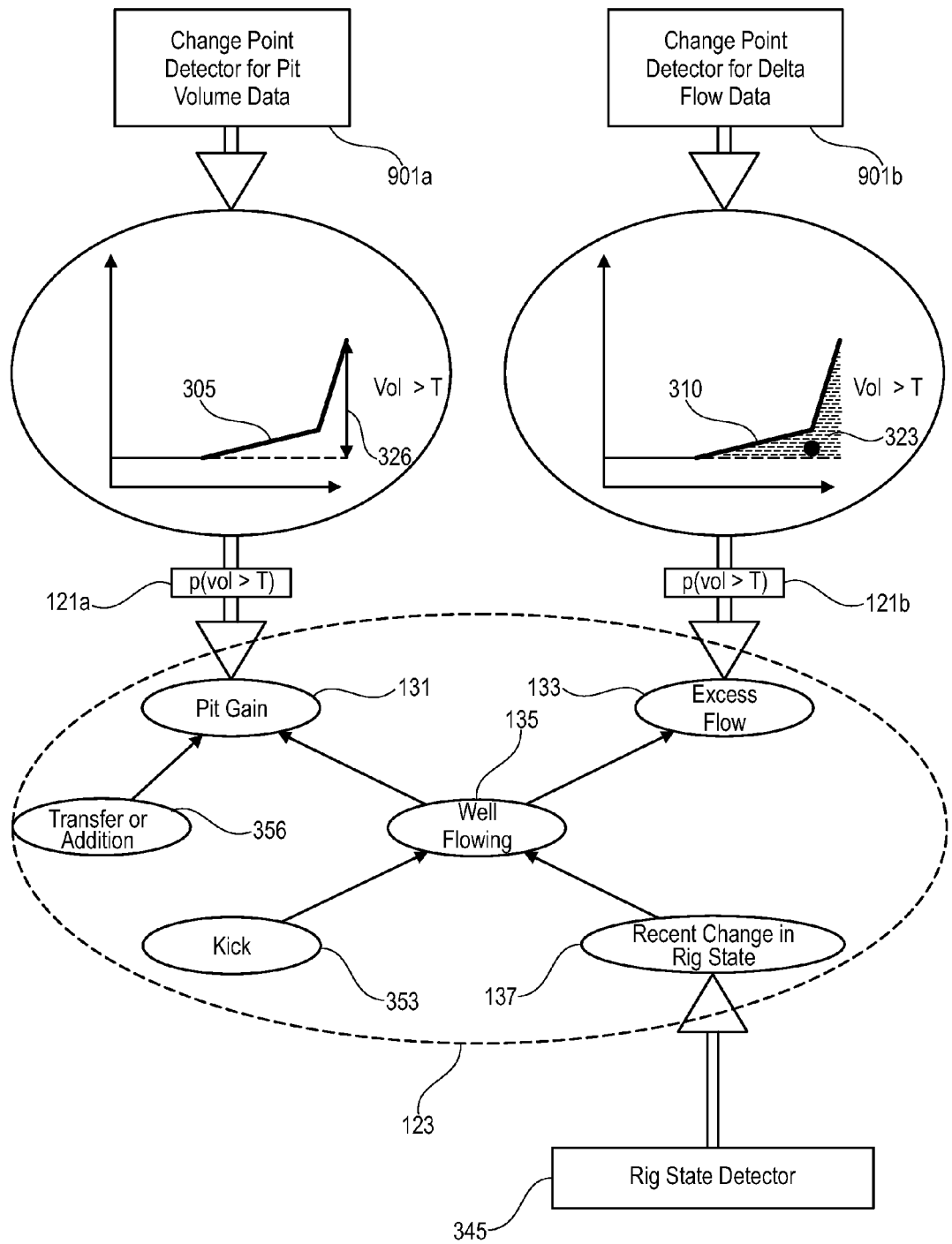
FIG. 12 is a data-flow illustration showing the output of the changepoint detector acting as an input to a Bayesian Belief Network (BBN) to use that output in conjunction with a change in rig state output to draw an inference as to whether a kick has occurred, according to one embodiment of the present invention.

FIG. 12 is a flow-type illustration of changepoint detector for analyzing an automated drilling process in which flow-out minus flow-in, called delta flow, and pit volume are probabilistically analyzed to identify changepoints, in accordance with an embodiment of the present invention. As depicted in FIG. 12, pit volume data 305 and delta flow data 310 are detected during an automated drilling process. In an embodiment of the present invention, changepoint detectors 901a and 901b may be applied to both the pit volume data 305 and the delta flow data 310.

As described previously, for example in conjunction with FIGS. 6 and 7, in an embodiment of the present invention, the pit volume data 305 and delta flow data 310 may be broken down into homogeneous segments in real-time. A first changepoint detector 901a associated with the pit volume data 305 may analyze the pit volume data 305 and from comparisons with previous segments may detect when one of the homogeneous segments of the incoming data does not have a positive gradient, e.g., the changepoint detector 901a may detect a step model or a ramp with negative gradient. Similarly, a second changepoint detector 901b associated with the delta flow data 310 may analyze the pit volume data 305 and from comparisons with previous segments may detect when one of the homogeneous segments of the incoming data does not have a positive gradient, e.g., the detector 901b may detect a step model or a ramp with negative gradient.

In accordance with some embodiments of the present invention, each of the plurality of the changepoint detectors 901 may process for the segment(s) with positive gradient the probability that the influx volume is greater than a threshold volume T. In FIG. 12 the volume is an area under the delta flow ramp(s) 323 and a vertical height 326 of the pit volume ramp(s). Each changepoint detector 901 may calculate the overall probability p(vol>T) as a weighted sum of the probabilities from all the segmentation hypotheses it has under consideration.

The two continuous probabilities p(vol>T) 121a and 121b may be entered into a BBN 123, specifically into a Pit Gain node 131 and an Excess Flow node 133. In an embodiment of the present invention, a condition Well Flowing node 135 may describe the conditional probabilities of an existence of more fluid exiting the wellbore being drilled in the automatic drilling process than entering the wellbore. Such a condition occurring in the drilling process may cause PitGain and ExcessFlow signatures in the surface channels. The Well Flowing node output 135 may be a result of a change in the drilling process, i.e., a recent change in rig state, node 137. For example, the circulation of fluid in the wellbore may not be at a steady-state due, for example to switching pumps on/off or moving the drilling pipe during the drilling process. Deliberate changes in the drilling process, such as changing pump rates, moving the drill pipe, changing drilling speed and/or the like may be referred as rig states. Detection of change of rig state is described in U.S. Pat. No. 7,128,167, *System and Method for Rig State Detection*, to Jonathan Dunlop, et al., issued Oct. 31, 2006.

In an embodiment of the present invention, a rig state detector 345 may be coupled with the drilling process system. The rig state detector 345 may receive data from the components of the drilling system, the wellbore, the surrounding formation and/or the like and may input a probability of recent change in rig state 137 to the changepoint detectors. In this way, the changepoint detectors 901 may determine when a detected changepoint results from the recent change in rig state 137. For example, in FIG. 12, the changepoint detector may identify when the Well Flowing node 135 may be caused by the recent change in rig state 137.

As depicted in FIG. 12, another cause of well flowing 135 may be a kick 353. In an embodiment of the present invention, the changepoint detector may analyze the pit volume data 305 and the delta flow data 310 to determine occurrence of a changepoint to determine whether the condition of the well flowing 135 has occurred and may use the probability of a recent change in rig state 350 to determine an existence of the kick 353.

In an embodiment of the present invention, the online determination of the kick 353 may cause an output of an alarm for manual intervention in the drilling process, may cause a control processor to change the automated drilling process and/or the like, for example, the detection of a kick 353 may be reported on a control console connected to the central surface processor 96. In certain aspects, data concerning the wellbore, the formation surrounding the wellbore, such as permeable formation in open hole with pore pressure greater than ECD may be input to the changepoint detector and may allow for greater accuracy in detection of the kick 353. In some aspects of the present invention, if fluid is being transferred into the active mud pit 78, data concerning such a transfer or addition 356 may be provided to the changepoint detector as it may cause the Pit Gain 330 but not Excess Flow 335. In such aspects of the present invention, by inputting the transfer or addition 356 to the changepoint detector(s), mistaken detection of the Kick 353 may be avoided.

In FIG. 12, the changepoint detectors 901 are provided raw data and may use Bayesian probability analysis or the like to model the data and determine an existence of a changepoint. The segmenting of the raw data may provide for flexible modeling of the data within individual segments, e.g., as linear, quadratic, or other regression functions.

If a kick is suspected a flow check is performed, whereby the mud pumps are stopped and any subsequent flow-out can definitively confirm a kick. To control a kick, the drillstring is lifted until a tool joint is just above the drill floor and then valves called blowout preventers are then used to shut-in the well. The influx is then circulated to the surface safely before drilling can resume. Small influxes are generally quicker and more simple to control, so early detection and shut-in is extremely important. Automating the above process should consistently minimize the non-productive time.

Other processes the present invention may be applied to in the hydrocarbon industry include: stuck pipe, lost circulation, drill bit stick-slip, plugged drill bit nozzles, drill bit nozzle washout, over- or under-sized gauge hole, drill bit wear, mud motor performance loss, drilling-induced formation fractures, ballooning, poor hole cleaning, pipe washout, destructive vibration, accidental sidetracking, twist-off onset, trajectory control of steerable assemblies, rate-of-penetration optimization, tool failure diagnostics and/or the like.

Turning now to a second example use of the changepoint detector 901, namely the application thereof to optimize the rate-of-penetration in drilling processes.

Consider again FIG. 5, which illustrates the changes to the linear bit response according to the PDC bit model as a drilling operation advances from one formation having one set of characteristics to another. As discussed hereinabove, the data points 509 lie on one line in the three dimensional WOB-bit torque-depth of cut space. And the three data points 511 lie on another line in that space. As, discussed above, real-time modeling of this data is challenging around formation boundaries. Therefore, in an embodiment, a changepoint detector 901 is used to determine the linear bit response and parameter values that may be derived therefrom. Using the changepoint detector 901 a straight line is fitted through the first set 509 and a second straight line is fitted through the second set 511 thereby avoiding polluting estimates for one formation with data collected from another, for example.

Figure 13:
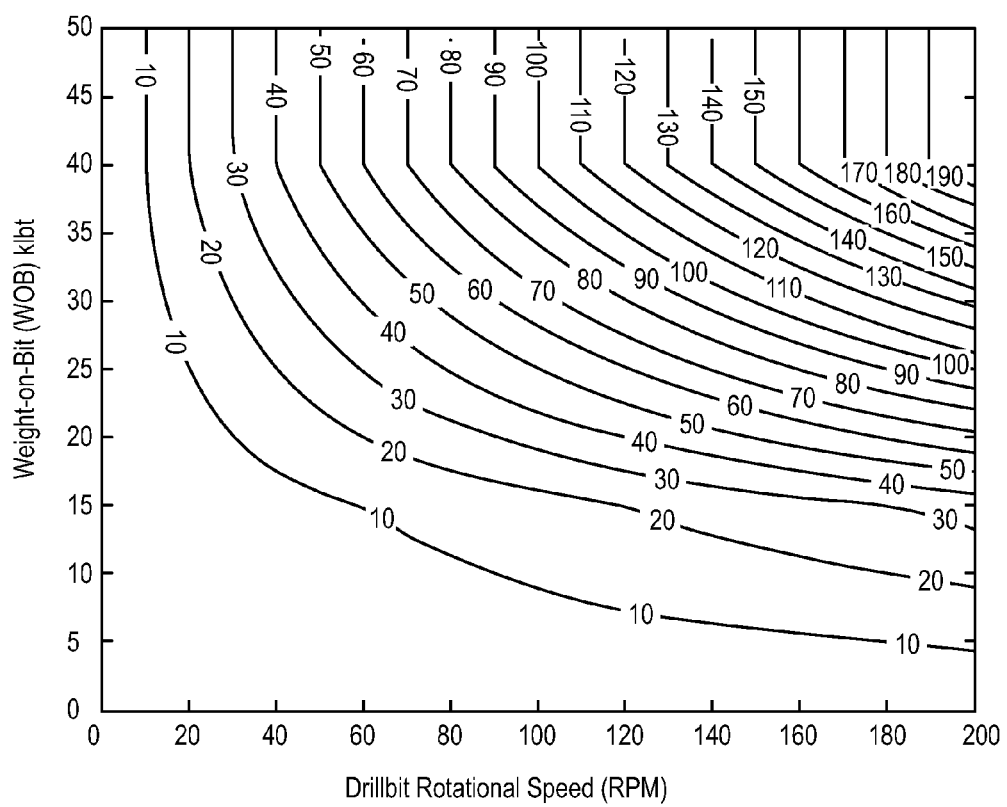
FIG. 13 is a graph illustrating the relationship between rate-of-penetration (ROP) as a function of weight-on-bit (WOB) and drill-bit-rotational speed (RPM), which relationship may be used in a processor for processing data to automate hydrocarbon processes according to one embodiment of the present invention.

Projecting the three dimensional fit onto the WOB-depth of cut plane gives a linear equation linking WOB, RPM and ROP. This can be rearranged to give ROP as a function of WOB and RPM, as shown by the contours in FIG. 13. Thus, for a given WOB-RPM pair a particular ROP may be expected.

Figure 14:
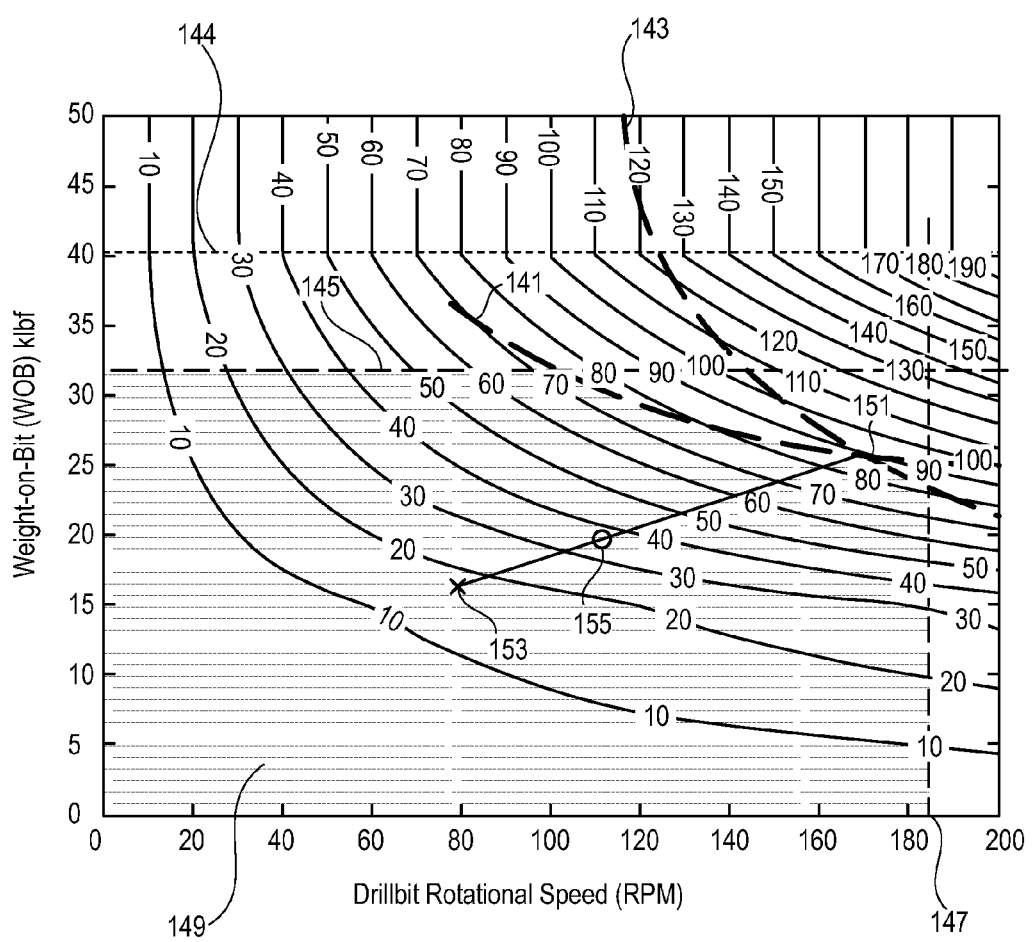
FIG. 14 is the graph of FIG. 13 having drilling process constraints super-imposed thereon to define a safe operating window, which window may be analyzed/used in a processor for processing data to automate hydrocarbon processes according to one embodiment of the present invention.

The coefficients of the bit/rock model allow various constraints to the drilling process to be expressed as a function of WOB and RPM and superimposed on the ROP contours as is illustrated in FIG. 14:

the ROP at which cuttings are being generated too fast to be cleaned from the annulus, 141,
the WOB that will generate excessive torque for the top drive, 143,
the WOB that will generate excessive torque for the drill pipe, 144,
the WOB that exceeds the drill bit specification for maximum weight on bit, 145,
the RPM that causes excessive vibration of the derrick, 147.

The region 149 below these constraints is the safe operating envelope. The WOB and RPM that generate the maximum ROP within the safe operating envelope may be sought and communicated to the driller. Alternatively, the WOB and RPM may be passed automatically to an autodriller or surface control system.

Examination of the boundaries of the safe operating window 149 reveal that the highest ROP within the safe operating window may be found at the intersection of the hole cleaning plot 141 and the top drive torque plot 143, referred to herein as the optimal parameters 151. For the sake of example, consider the drilling operation current RPM and WOB being located at 80 rpm and 15 klbf (153), respectively, with an ROP of approximately 18 ft/hr. The ROP at the optimal parameter combination 151, on the other hand, is approximately 90. Thus, a driller increasing the RPM and WOB in the direction of the optimal parameters would improve the ROP. In a preferred embodiment, an ROP optimizer suggests an intermediate combination of RPM and WOB, e.g., the parameter combination approximately ½ the distance 155 between the current parameter combination 153 and the optimal combination 151.

The data that defines the ROP contours and the parameters for the safe operating window are continuously reported from sensors on the drilling apparatus. These sensors may either be located at the surface or in the drill string. If located at the surface, some filtering and preprocessing may be necessary to translate the measured values to corresponding actual values encountered by the drillbit and drillstring.

The continuous stream of data is modeled using the PDC model of FIG. 5. As new data arrives, the best fit for the data points may change slightly and require minimal adjustments in the model used for determining the ROP contours. When encountering new formations, abrupt changes may be expected. The changepoint detector 901 is used to segment the incoming data to allow for changes in the model used to calculate the ROP contours.

Figure 15:
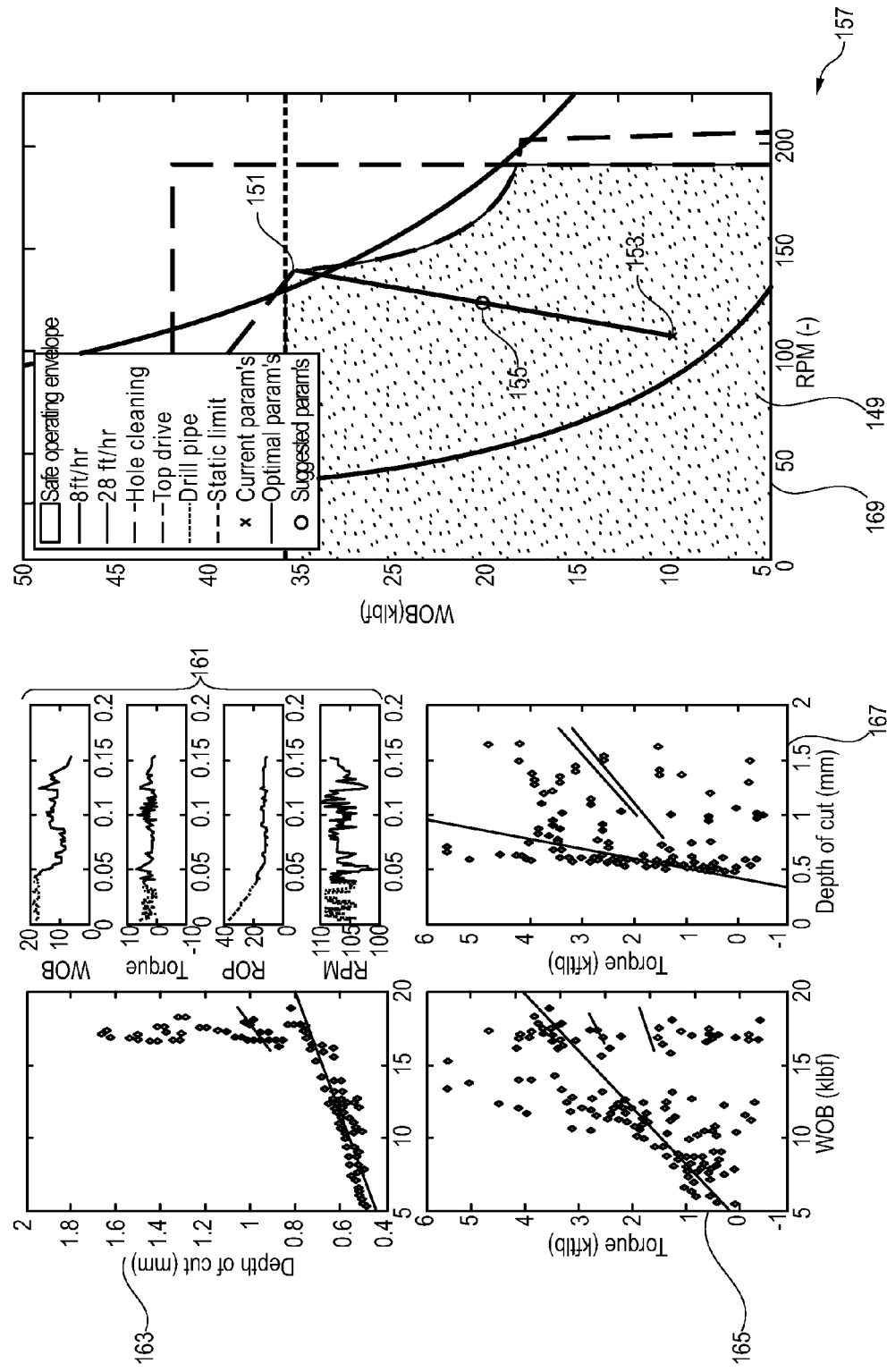
FIG. 15 is a screen shot of a graphic user's interface displaying drilling data collected during a drilling operation, straight line models corresponding to a preferred segmentation, the safe operating window corresponding to the current segmentations, current drilling parameters used, and recommended parameters to optimize rate of penetration, according to one embodiment of the present invention.

FIG. 15 is a graphics user's interface 157 of an ROP optimizer using a changepoint detector 901 to determine segmentation models for the PDC model, the ROP contours that may be derived therefrom, the safe operating envelope, and recommended WOB and RPM parameters. Four windows 161 plot WOB, torque, ROP, and RPM, respectively, against a depth index. In another window 163, depth-of-cut is plotted against WOB. In yet another window 165, torque is plotted against WOB. Finally, torque is plotted against depth-of-cut in yet another window 167.

The data is segmented using the changepoint detector 901 and fit to appropriate linear models corresponding to each segment in the manner discussed hereinabove. The different colors illustrated in the various graphs 161 through 167 represent different segments, respectively. By examining the plots against depth index of graphs 161 it will be appreciated that in this example, blue represents the first segment, red, the second, and green, the current segment. As will be appreciated from the depth of cut versus WOB graph 163, the linear relationship expected between these from the PDC model has changed dramatically in the course of the drilling operation corresponding to the data points plotted in FIG. 15.

The safe operating envelope and drilling contours window 169 contains a display of the safe operating envelope 149, the current parameters 153, the optimal parameters 151 and recommended parameters 155 corresponding to the current segmentation model.

The graphic user's interface 157 may be reported on a control console connected to the central surface processor 96.

Figure 16:
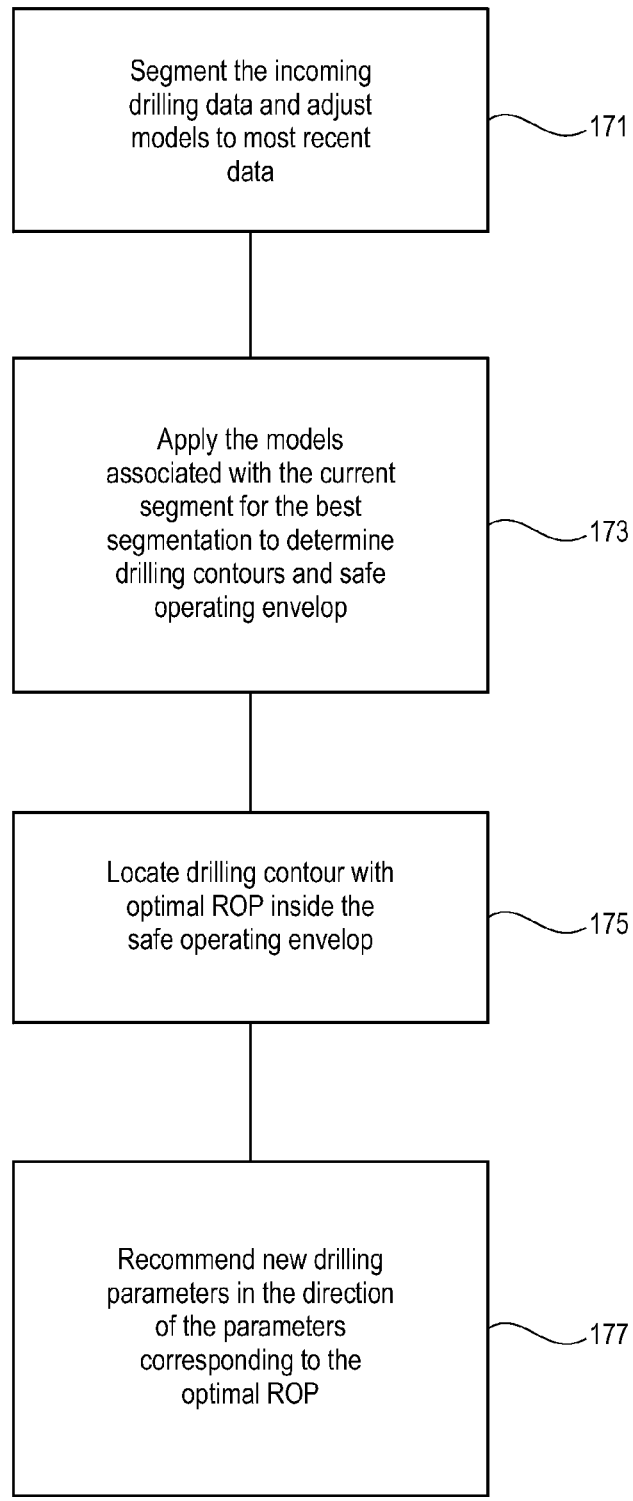
FIG. 16 is a flow-chart illustrating the operation of the changepoint detector to determine recommended parameters in an ROP optimizer, according to one embodiment of the present invention.

FIG. 16 is a flow-chart illustrating the operation of the changepoint detector to determine recommended parameters in an ROP optimizer illustrating the operation as new drilling data is received in real-time. First, the drilling data is segmented using the changepoint detector 901, step 171, in the manner discussed herein above. The segmentation divides the data into homogenous segments and associates models to fit to the data in the segment. Thus, at a given time, there is a best segmentation. That best segmentation further has a current segment that corresponds to the most recently arrived drilling data. The data fit is performed in real-time thus adjusting the models to take the latest arrived data into account.

Having determined the best segmentation and the models for the current segment these models are used to determine the ROP contours corresponding to the PDC model fit to the data points in the current segment and the safe operating envelope corresponding to the drilling constraints corresponding to the current segment, step 173.

The ROP contours and safe operating envelope are used to determine the optimal ROP contour inside the safe operating envelope and the WOB and RPM that correspond to that optimal ROP contour, step 175.

A mud motor or turbine is sometimes added to the bottom-hole assembly 56 that converts hydraulic power from the mud into rotary mechanical power. With such an assembly, bit RPM is function of surface RPM and mud flow rate, and consequently, the optimum ROP is a function of surface RPM, WOB and flow rate; the algorithm corresponding algorithm therefore suggests these three drilling parameters to the driller. The relationship between flow rate and the RPM of the shaft of the motor/turbine is established by experimentation and published by most vendors. Alternatively by measuring rotor speed downhole, this relationship may be inferred in real-time. Given either of these relationships, the algorithm above can be extended to give an equation of ROP as a function of surface RPM, WOB and flow rate. Useful extra constraints to add are:

- the flow rate that causes the pressure of the mud in the annulus to fall below a given value that may cause the borehole to collapse or formation fluids to enter the wellbore and cause a kick
- the flow rate that causes the pressure of the mud in the annulus to exceed a given value that may cause the borehole to fracture
- the mechanical power output of the motor at which there is a risk of motor stalling (reference Walter Aldred et al., *Optimized Drilling With Positive Displacement Drilling Motors*, U.S. Pat. No. 5,368,108 (Nov. 29, 1994) and Demosthenis Pafitis, *Method For Evaluating The Power Output Of A Drilling Motor Under Downhole Conditions*, U.S. Pat. No. 6,019,180 (Feb. 1, 2000)

A recommended set of new drilling parameters, e.g., RPM and WOB, that move the current parameters towards the optimal parameters is provided, step 177, either to a human operator or to an automated drilling apparatus.

The above-described technology for optimizing rate-of-penetration is applicable to other structures and parameters. In one alternative embodiment the technique is applied to roller cone bits using appropriate models for modeling the drilling response of a roller cone bit. In yet further alternative embodiments, the above-described mechanisms are applied to drilling processes that include additional cutting structures to the bit, such as reamers, under-reamers or hole openers by including a downhole measurement of WOB and torque behind the drill bit. In one alternative to that embodiment, a second set of measurements behind the additional cutting structure is included.

In a further alternative embodiment, a bit wear model could be added to allow the bit run to reach the casing point without tripping for a new bit.

Turning now to a third example of the use of a changepoint detector 901 in the realm of industrial automation, namely, in directional drilling of wells into targeted subterranean formations. Calculation of wellbore curvature (also known as dogleg severity ("DLS")) and direction (also known as toolface) are very useful in the field of Directional Drilling. The directional driller uses curvature and direction to predict whether or not a target will be intersected. In an embodiment of the invention, curvature and direction estimates are provided continuously during a drilling operation on the order of every ½ foot to allow a driller the opportunity to correct the drilling operation if the wellbore is deviating off plan. The directional driller thus is able to evaluate deflection tool performance using higher resolution curvature and direction estimates.

The curvature and direction can be used to determine formation effects on directional drilling. In particular, if the changepoint detector indicates a changepoint at a formation bed boundary, the new formation will have a different directional tendency from the previous formation. The resultant curvature and direction can be used to study and evaluate the effects of surface driving parameters such as weight on bit and rpm on directional performance. A detailed understanding of how current deflection tools deviate a well can be used to engineer future tools. Finally, a continuous curvature and direction of the curvature may be used in autonomous and semi-autonomous directional drilling control systems.

Figure 17:
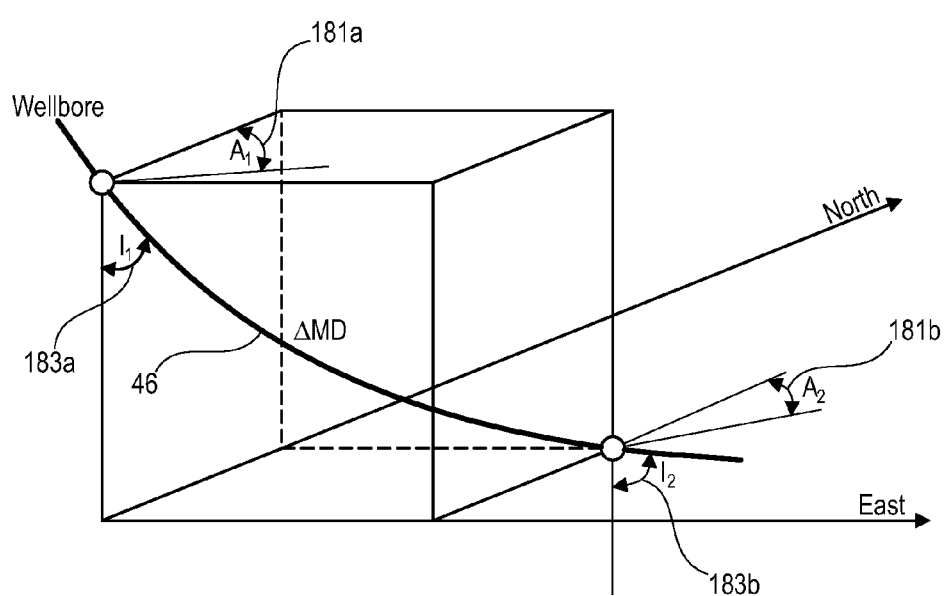
FIG. 17 is a three-dimensional graph illustrating azimuth and inclination of a wellbore through a three-dimensional space, which data may be used in a processor for processing data to automate hydrocarbon processes according to one embodiment of the present invention.

FIG. 17 is a three-dimensional graph illustrating azimuth and inclination of a wellbore through a three-dimensional space at two different locations. Azimuth 181a and 181b at a location is the compass direction of a wellbore 46 as measured by a directional survey. The azimuth 181a is usually specified in degrees with respect to the geographic or magnetic north pole. Inclination 183a and 183b at a location is the deviation from vertical, irrespective of compass direction, expressed in degrees. Inclination is measured initially with a pendulum mechanism, and confirmed with accelerometers or gyroscopes.

Figure 18:
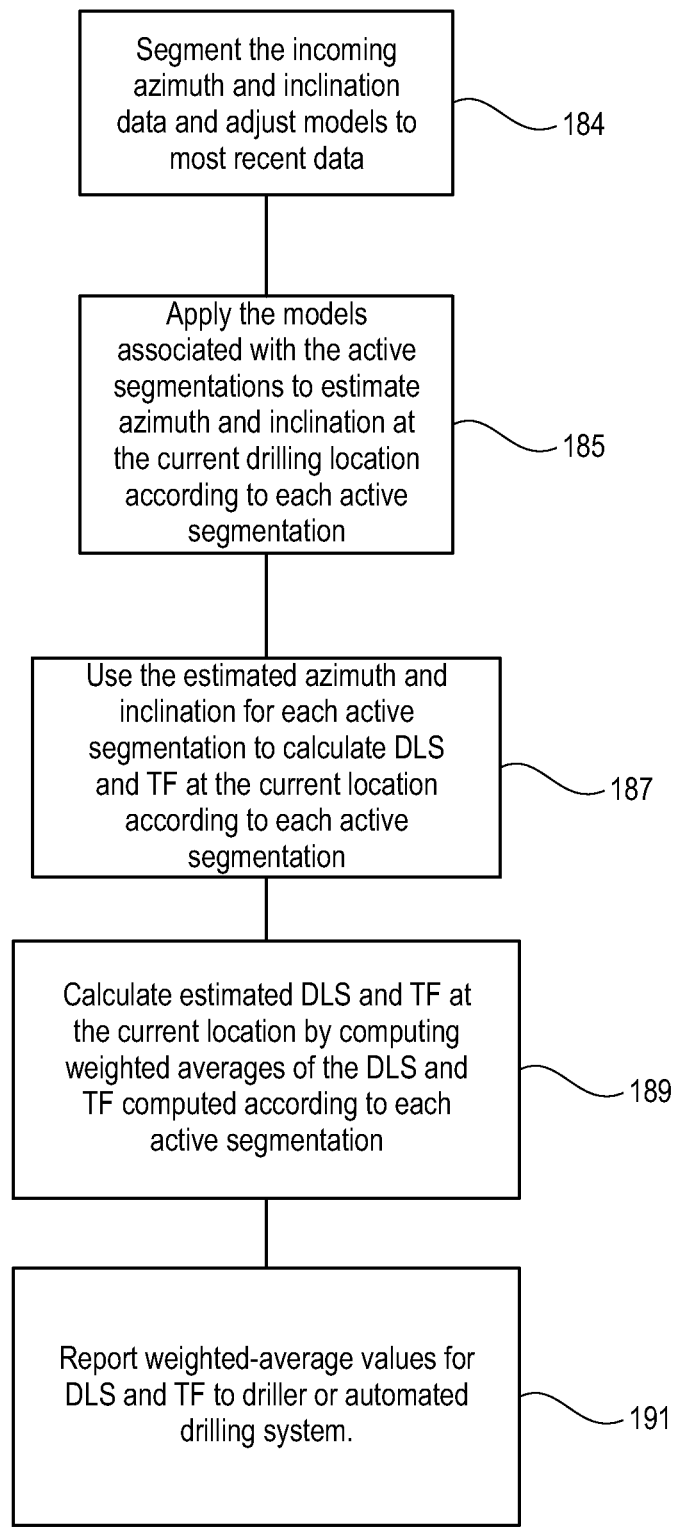
FIG. 18 is a flow-chart illustrating the use of a changepoint detector in determining real-time estimates for dogleg severity and toolface from azimuth and inclination data collected during a drilling operation, according to one embodiment of the present invention.

FIG. 18 is a flow-chart illustrating the use of a changepoint detector in determining real-time estimates for dogleg severity and toolface from azimuth and inclination data collected during a drilling operation. The continuous inclination and azimuth measurements received from these sensors on the drilling equipment are processed by a changepoint detection system using a general linear model (changepoint detector). The changepoint detector segments the data into a plurality of segmentations and associated segment models as discussed herein above, step 184, resulting in a segmentation, for example, as shown in FIG. 9.

The segmentation step 184 results in a number of different segmentations of the input azimuth and inclination data. Each is associated with a particle in a tertiary tree as illustrated in FIG. 7 and has associated therewith a list of segments and corresponding models, e.g., ramps and steps. These segment models are used to estimate the azimuth and inclination at the current drilling location, step 185. Thus, rather than accepting the sensor values for azimuth and inclination, those sensor values being used to adjust the models by being considered by the segmentation step 184, the azimuth and inclination values used to estimate dogleg severity and toolface are the estimated values obtained by using the segmentation models. The azimuth and inclination values are calculated for each active segmentation.

To calculate the azimuth and inclination values at a depth location MD2, using a segmentation p, the following formula is used:

$$DLS_p = A\cos(I2-I1) - \sin(I1)*\sin(I2)*(1.0-\cos(A2-A1))/(MD2-MD1)) \quad (1)$$

$$y = \cos(A2-A1)*\sin(I2)*\sin(I1) \quad (2)$$

$$GTF_p = A\cos(\cos(I1)*y - \cos(I2))/(\sin(I1)*\sin(A\cos(y))) \quad (3)$$

where:

I1 and I2 are the inclination values computed at the changepoint MD1 starting the segment to which the particular depth location MD2 belongs and at the particular depth location MD2 using the inclination model associated with the segment to which the particular depth location MD2 belongs, respectively;

A1 and A2 are the azimuth values computed at the changepoint MD1 starting the segment to which the particular depth location MD2 belongs and at the particular depth location MD2 using the inclination model associated with the segment to which the particular depth location MD2 belongs, respectively;

$DLS_p$ is the dogleg severity at MD2 computed with the segmentation p; and $GTF_p$ is the toolface at MD1 computed with the segmentation p.

Weighted averages are then calculated from the per-segmentation calculated values for dogleg severity and toolface, step 189, using the following formulas:

$$DLS = \sum_{p \in Segmentations} DLS_p * Weight_p$$

$$TF = ATAN\left(\frac{\sum_{p \in Segmentations} SIN(TF_p) * Weight_p}{\sum_{p \in Segmentations} COS(TF_p) * Weight_p}\right)$$

where Segmentations is the set of all active segmentations, $Weight_p$ is the weight associated with a particular segmentation p.

The resulting dogleg severity ("DLS") and toolface ("TF") values are then reported to a directional driller who may use these values to assess the effect of surface driven parameters such a weight-on-bit and RPM on the directional drilling process, step 191. The driller may then adjust these parameters to improve the trajectory of the wellbore with respect to a desired target. Alternatively, the resulting dogleg severity ("DLS") and toolface ("TF") values are input into an automated drilling system that automatically adjusts the surface driven parameters based on these values to improve the wellbore trajectory with respect to a desired target. The resulting dogleg severity ("DLS") and toolface ("TF") values may be reported on a control console connected to the central surface processor 96.

From the foregoing it will be apparent that a technology has been presented herein that provides for a mechanism for real-time or near real-time determination of changes in industrial processes in a manner that allows operators of such processes, which operators may be human controllers, processors, drivers, control systems and/or the like to make note of/detect events in the operation of a hydrocarbon associated procedure, take corrective action if necessary, change operation of the procedure if desired and/or optimally operate the processes in light of the changes in the operating environment, status of the system performing the procedure and/or the like. The technology presented provides for a mechanism that is noise tolerant, that may be readily applied to a variety of hydrocarbon associated processes, and that is computationally inexpensive.

The solutions presented may either be used to recommend courses of action to operators of industrial processes or as input in process automation systems. While the techniques herein are described primarily in the context of exploration for subterranean hydrocarbon resources through drilling, the techniques are applicable to other hydrocarbon related processes, for example, the exploration for water, transport of hydrocarbons, modeling of production data from hydrocarbon wells and/or the like.

In the foregoing description, for the purposes of illustration, various methods and/or procedures were described in a particular order. It should be appreciated that in alternate embodiments, the methods and/or procedures may be performed in an order different than that described.

It should also be appreciated that the methods described above may be performed by hardware components and/or may be embodied in sequences of machine-executable instructions, which may be used to cause a machine, such as a general-purpose or special-purpose processor or logic circuits programmed with the instructions, to perform the methods. These machine-executable instructions may be stored on one or more machine readable media, such as CD-ROMs or other type of optical disks, floppy diskettes, ROMs, RAMs, EPROMs, EEPROMs, magnetic or optical cards, flash memory, or other types of machine-readable media suitable for storing electronic instructions.

Merely by way of example, some embodiments of the invention provide software programs, which may be executed on one or more computers, for performing the methods and/or procedures described above. In particular embodiments, for example, there may be a plurality of software components configured to execute on various hardware devices. Alternatively, the methods may be performed by a combination of hardware and software.

Hence, while detailed descriptions of one or more embodiments of the invention have been given above, various alternatives, modifications, and equivalents will be apparent to those skilled in the art without varying from the spirit of the invention. Moreover, except where clearly inappropriate or otherwise expressly noted, it should be assumed that the features, devices and/or components of different embodiments can be substituted and/or combined. Thus, the above description should not be taken as limiting the scope of the invention, which is defined by the appended claims.

The invention claimed is:

1. A method for automating or partially automating optimization of a drilling operation in the hydrocarbon industry, where the drilling operation is subject to a change in one or more operating conditions, can be controlled by at least one parameter and is monitored by sensors providing input data streams, comprising:

receiving input data streams indicative of depth-of-cut, weight-on-bit and drill-bit rotational speed;

upon receiving a new data item in one of the input data streams, using a processor to postulate that the input data stream is segmented according to a plurality of possible segmentations, wherein each of the plurality of possible segmentations comprises a plurality of segments divided by one or more changepoints, and wherein the changepoints are indicative of a change in at least one of the one or more operating conditions;

evaluating each of the plurality of possible segmentations by:

fitting portions of the input data corresponding to each segment in the segmentation being evaluated to a model corresponding to the each segment in the segmentation being evaluated; and determining how well the models for the segments of the segmentation being evaluated fit the portions of the input data corresponding to each segment of the segmentation being evaluated;

generating an output in the form of a functional relationship defining rate-of-penetration (ROP) as a function of weight-on-bit and drill-bit rotational speed from at least one of the plurality of possible segmentations and the models corresponding to the segments of the at least one of the plurality of possible segmentations;

determining operating constraints defining a safe operating envelope as a function of drill-bit rotational speed and weight-on-bit;

determining the rotational speed and weight-on-bit parameters that provide the optimal rate-of-penetration location within the safe operating envelope; and outputting a combination of drill-bit rotational speed and weight-on-bit to move the drill-bit rotational speed and weight-on-bit towards the rotational speed and weight-on-bit parameters for the optimal rate-of-penetration location.

2. The method of claim 1, further comprising:
periodically removing from consideration segmentations having evaluation results indicative of poor model fit of the models corresponding to the segments of the segmentation.

3. The method of claim 2, further comprising:
upon receiving additional data in the input data stream, only considering as the possible segmentations any segmentations remaining after removing from consideration the segmentations having evaluation results indicative of poor model fit.

4. The method of claim 1, wherein the models are selected from step functions and ramp functions.

5. The method of claim 1, wherein the step of evaluating each of the plurality of possible segmentations comprises using Bayesian Model Selection to assign weights to each segment in each segmentation, and wherein the weight associated with each segment is an accuracy measurement of the models corresponding to the segment fit to the data associated with the segment.

6. The method of claim 1, wherein the step of fitting portions of the input data corresponding to each segment in the segmentation being evaluated is performed using linear regression.

7. The method of claim 1, further comprising:
creating a treestructure having nodes representing particles corresponding to particular segmentations, where at index i, a set of particles (parent particles), each corresponding to a particular segmentation, are held active; and
for each new data item received from the input data stream at index i+1, creating a plurality of child nodes to each node active parent particle node, each child node corresponding to either a continuation of the segment to which the parent particle node corresponds or a start of a new segment with a new model.

8. The method of claim 2, further comprising
representing each possible segmentation for n data points as a plurality of particles, wherein the removal step comprises removing from consideration particles representing poor-fit segmentations.

9. The method of claim 8, further comprising
upon receiving an additional data point (n+1) on the input data, spawning additional particles as child particles from each active particle and corresponding to each new possible segmentation involving the new data point.

10. The method of claim 1, wherein the step of using the output to control at least one parameter of the hydrocarbon industry process comprises:
indicating to a controller of the at least one parameter that a likely change of operating condition has occurred; and
adjusting the at least one parameter in response to the indication that a likely change of operating condition has occurred.

11. The method of claim 1, wherein generating an output from at least one of the plurality of possible segmentations and the models corresponding to the segments of the at least one of the plurality of possible segmentations comprises:
computing a probability of a first condition having occurred;
feeding the probability of the first condition having occurred into an inference engine;
operating the inference engine to determine whether a first event has occurred.

12. The method of claim 11, computing a probability of a first condition having occurred comprises computing a value as a function of the models corresponding to the segments of each segmentation under consideration, comparing that value to a threshold condition, and declaring that the probability of the first condition having occurred as the weighted sum of the probabilities associated with the segmentation for which the computed value satisfies the threshold condition.

13. The method of claim 11, further comprising:
inputting at least one additional probability of a second condition having occurred into the inference engine;
operating the inference engine to determine the probability of each of the first event and of a second event having occurred causing the first condition to occur.

14. The method of operating an automated drilling apparatus of claim 1, further comprising:
defining the functional relationship between rate-of-penetration, weight-on-bit and drill-bit rotational speed as a first functional relationship between rate of penetration and weight-on-bit and from the first functional relationship defining a second functional relationship defining rate-of-penetration as a function of drill-bit rotational speed and weight- on-bit; and
upon receiving additional measurements of depth-of-cut, weight-on-bit and drill-bit rotational speed, updating the functional relationship between depth-of-cut and weight-on-bit and the second functional relationship defining rate-of-penetration as a function of drill-bit rotational speed and weight-on-bit, and the operating constraints defining the safe operating envelope.

15. The method of operating an automated drilling apparatus of 14, wherein the step of updating the functional relationship defining rate-of-penetration as a function of drill-bit rotational speed and weight-on-bit comprises:
postulating that the data streams are segmented according to a plurality of possible segments divided by change-points each indicative of a change in operating condition;
evaluating each segmentation by:
fitting the input stream data corresponding to each segment in the segmentation to a model corresponding to the each segment in the segmentation; and
evaluating the segmentations by determining how well the models for the segments of each segmentation fit the input data corresponding to each segment of each segmentation; and
using at least one of the most likely segmentations and the models corresponding to the segments of the at least one most likely segmentations to determine the functional relationship between depth-of-cut and weight-on-bit and the second functional relationship defining rate-of-penetration as a function of drill-bit rotational speed and weight-on-bit, and the operating constraints defining the safe operating envelope.

16. The method of operating an automated drilling apparatus of 15, further comprising:
removing from consideration any segmentations having low probability of providing a close-fit modeling of the data streams.

17. The method of operating an automated drilling apparatus of 15, further comprising:
upon receiving an additional data point, postulating further segmentations based on currently active segmentations and possible alternative segmentations deriving from the active segmentations wherein for each active segmentation the possible alternative segmentations represent continuation of the each active segmentation, and new segmentations representing alternative models for the received additional data point.

18. A hydrocarbon industry drilling control system connected to sensors that produce streams of input data indicative of depth-of-cut, weight-on-bit and drill-bit rotational speed, comprising:
- a processor with a communications connection to receive the streams of input data;
- a storage system comprising processor-executable instructions that comprises instructions to cause the processor to:
- upon receiving a new data item from the input data streams:
- postulating that the data stream is segmented according to a plurality of possible segmentations each comprising a plurality of segments divided by changepoints each changepoint indicative of a change in operating condition;
- evaluating each segmentation by:
- fitting the input stream data corresponding to each segment in the segmentation to a model corresponding to the each segment in the segmentation; and
- evaluating the segmentations by determining how well the models for the segments of each segmentation fit the input data corresponding to each segment of each segmentation; and
- using at least one of the segmentations and the models corresponding to the segments of the at least one of the segmentations as input to a control program controlling at least one parameter of the process in the hydrocarbon industry, by:
- determining operating constraints defining a safe operating envelope as a function of drill-bit rotational speed and weight-on-bit;
- determining the rotational speed and weight-on-bit parameters that provide the optimal rate-of-penetration location within the safe operating envelope; and
- outputting a combination of drill-bit rotational speed and weight-on-bit to move the drill-bit rotational speed and weight-on-bit towards the rotational speed and weight-on-bit parameters for the optimal rate-of-penetration location.

19. The control system of claim 18, wherein the processor-executable instructions further comprises instructions to cause the processor to:
- periodically remove from consideration segmentations having evaluation results indicative of poor model fit of the models corresponding to the segments of the segmentation; and
- upon receiving additional data on the data stream only consider further segmentations based upon segmentations that remain after the removing from consideration segmentations having evaluation results indicative of poor model fit.

20. The control system of claim 18, wherein the models are selected from step functions and ramp functions.

21. The control system of claim 18, wherein the instructions to evaluate each segmentation cause the processor to perform a Bayesian Model Selection to assign weights to each segment in each segmentation wherein the weight associated with each segment is an accuracy measurement of the models corresponding to the segment fit to the data associated with the segment.

22. The control system of claim 18, wherein the fitting of the input data stream data corresponding to each segment in the segmentation is performed using linear regression.

23. The control system of claim 18, wherein the processor-executable instructions further comprises instructions to cause the processor to:
- create a treestructure having nodes representing particles corresponding to particular segmentations;
- to, at index i, hold active a set of particles (parent particles), each corresponding to a particular segmentation;
- for each new data item received from the input data stream at index i+1, creating a plurality of child nodes to each node active parent particle node, each child node corresponding to either a continuation of the segment to which the parent particle node corresponds or a start of a new segment with a new model.

24. The control system of claim 19, wherein the processor-executable instructions further comprises instructions to cause the processor to:
- represent each possible segmentation for n data points as a plurality of particles;
- wherein the removal step comprises removing from consideration particles representing poor-fit segmentations; and
- upon receiving an additional data point (n+1), spawning additional particles as child particles from each active particle and corresponding to each new possible segmentation involving the new data point.

25. The control system of claim 18, wherein the instruction to use at least one of the segmentations and the models corresponding to the segments of the at least one of the segmentations to a control program controlling at least one parameter of the process in the hydrocarbon industry comprise instructions to cause the processor to
- indicate to a controller of the at least one parameter that a likely change of operating condition has occurred; and
- adjusting the at least one parameter in response to the indication that a likely change of operating condition has occurred.

26. The control system of claim 18, wherein the instructions to use at least one of the segmentations and the models corresponding to the segments of the at least one of the segmentations as input to a control program controlling at least one parameter of the process in the hydrocarbon industry comprises instructions to cause the processor to:
- compute a probability of a first condition having occurred;
- feed the probability of the first condition having occurred into an inference engine; and
- operate the inference engine to determine whether a first event has occurred.

27. The control system of claim 26, wherein the instructions to compute a probability of a first condition having occurred comprises instructions to cause the processor to compute a value as a function of the models corresponding to the segments of each segmentation under consideration, comparing that value to a threshold condition, and declaring that the probability of the first condition having occurred as the weighted sum of the probabilities associated with the segmentation for which the computed value satisfies the threshold condition.

28. The control system of claim 18, wherein the processor-executable instructions further comprises instructions to cause the processor to:
- input at least one additional probability of a second condition having occurred into the inference engine;
- operate the inference engine to determine the probability of each of the first event and of a second event having occurred causing the first condition to occur.

29. The drilling control system of claim 18, wherein the determining of a functional relationship defining rate-of-penetration (ROP) as a function of weight-on-bit and drill-bit rotational speed comprises:

defining the functional relationship between rate-of-penetration, weight-on-bit and drill-bit rotational speed as a first functional relationship between rate of penetration and weight-on-bit and from the first functional relationship defining a second functional relationship defining rate-of-penetration as a function of drill-bit rotational speed and weight-on-bit ; and upon receiving additional measurements of depth-of-cut, weight-on-bit and drill-bit rotational speed, updating the functional relationship between depth-of-cut and weight-on-bit and the second functional relationship defining rate-of-penetration as a function of drill-bit rotational speed and weight-on-bit, and the operating constraints defining the safe operating envelope.

30. The drilling control system of claim 29, wherein updating the functional relationship defining rate-of-penetration as a function of drill-bit rotational speed and weight-on-bit comprises:

postulating that the data streams are segmented according to a plurality of possible segments divided by change-points each indicative of a change in operating condition;

evaluating each segmentation by:

fitting the input stream data corresponding to each segment in the segmentation to a model corresponding to the each segment in the segmentation; and evaluating the segmentations by determining how well the models for the segments of each segmentation fit the input data corresponding to each segment of each segmentation; and using at least one of the most likely segmentations and the models corresponding to the segments of the at least one most likely segmentations to determine the functional relationship between depth-of-cut and weight-on-bit and the second functional relationship defining rate-of-penetration as a function of drill-bit rotational speed and weight-on-bit, and the operating constraints defining the safe operating envelope.

31. The drilling control system of claim 30, updating the functional relationship defining rate-of-penetration as a function of drill-bit rotational speed and weight-on-bit comprises:

removing from consideration any segmentations having low probability of providing a close-fit modeling of the data streams.

32. The drilling control system of claim 30, updating the functional relationship defining rate-of-penetration as a function of drill-bit rotational speed and weight-on-bit comprises:

upon receiving an additional data point, postulating further segmentations based on currently active segmentations and possible alternative segmentations deriving from the active segmentations wherein for each active segmentation the possible alternative segmentations represent continuation of the each active segmentation, and new segmentations representing alternative models for the received additional data point.

* * * * *